(12) United States Patent
Hsieh et al.

(10) Patent No.: US 11,545,906 B2
(45) Date of Patent: Jan. 3, 2023

(54) PHASE-SHIFTED FULL-BRIDGE CONVERTER WITH HALF-CURRENT MULTIPLIER OUTPUT AND CONTROL METHOD THEREOF

(71) Applicants: Amicord Technologies Co., Ltd, Taipei (TW); National Chiayi University, Chiayi (TW)

(72) Inventors: Hung-I Hsieh, Chiayi (TW); Kuan-Pin Huang, Taipei (TW)

(73) Assignees: Amicord Technologies Co., Ltd., Taipei (TW); National Chiayi University, Chiayi (TW)

( * ) Notice: Subject to any disclaimer, the term of this patent is extended or adjusted under 35 U.S.C. 154(b) by 173 days.

(21) Appl. No.: 16/942,526

(22) Filed: Jul. 29, 2020

(65) Prior Publication Data
US 2022/0006387 A1    Jan. 6, 2022

(30) Foreign Application Priority Data
Jun. 30, 2020   (TW) ................... 109122141

(51) Int. Cl.
*H02M 3/335*    (2006.01)
*H02M 1/08*     (2006.01)
*H02M 1/00*     (2006.01)

(52) U.S. Cl.
CPC ......... *H02M 3/33573* (2021.05); *H02M 1/08* (2013.01); *H02M 1/0048* (2021.05)

(58) Field of Classification Search
CPC .. H02M 3/33569; H02M 1/08; H02M 1/0048; H02M 7/53878; H02M 1/0064; H02M 3/33573; H02M 3/01
See application file for complete search history.

(56) References Cited

U.S. PATENT DOCUMENTS

2006/0109696 A1*   5/2006   Ren .................. H02M 3/3376
                                                    363/81

OTHER PUBLICATIONS

H. Hsieh, K. Huang and G. Hsieh, "Analysis and realization study of a 1-kW phase-shift full-bridge converter with current-doubler rectifier for battery charging," 2016 IEEE 8th International Power Electronics and Motion Control Conference, 2016, pp. 439-444, doi: 10.1109/IPEMC.2016.7512326. (Year: 2016).*

(Continued)

*Primary Examiner* — Kyle J Moody
(74) *Attorney, Agent, or Firm* — Bever, Hoffman & Harms, LLP

(57) ABSTRACT

A phase-shifted full-bridge converter and a control method thereof are disclosed. The proposed control method of a phase-shifted full-bridge converter, wherein the phase-shifted full-bridge converter includes a full-bridge switching circuit having a first and a second output terminals, a main transformer having a primary winding and coupled to the switching circuit, and an autotransformer having a primary winding and coupled to the main transformer, includes providing an induced common current flowing through the primary winding of the autotransformer; and causing the induced common current being reflected to the primary winding of the main transformer to cause a primary side current flowing through the primary winding of the main transformer to increase both slopes of a valid duty cycle and a dead-zone period such that the primary side current has a relatively lower transition level and a relatively shorter transition time.

10 Claims, 25 Drawing Sheets

(56) References Cited

OTHER PUBLICATIONS

Huang, Kuan-Pin et al., paper entitled "Phase-Shifted Full-Bridge Converter for a Half-Current-Multiplier Rectifier Using an Autotransformer-Based Filter", IEEE Transactions on Transportation Electrification, vol. 6, No. 1, Mar. 2020, pp. 199-212 (14 pages).

* cited by examiner

PHASE-SHIFTED FULL-BRIDGE CONVERTER WITH HALF-CURRENT MULTIPLIER OUTPUT AND CONTROL METHOD THEREOF

CROSS-REFERENCES TO RELATED APPLICATIONS

This application claims the benefit of Taiwan Patent Application Number 109122141 filed on Jun. 30, 2020, at the Taiwan Intellectual Property Office, the disclosures of which are incorporated herein in their entirety by reference.

FIELD OF THE INVENTION

The present invention relates to a phase-shifted full-bridge (PS-FB) converter with a half-current multiplier output and a control method thereof, in particular to a PS-FB converter with a half-current multiplier rectifier (HCMR) filter and a control method thereof, wherein the filter is based on a structure of an autotransformer and can increase an output current of the PS-FB converter to a 1.5 times of an output current of the filter.

BACKGROUND OF THE INVENTION

The well-known PS-FB converter with a one-inductor filter is still a suitable and reliable source of power supply, which attains high-efficiency power output by reducing switching loss via the use of phase-shifted zero-voltage switching (ZVS). In order to improve the power handling capability of PS-FB converter, many different studies have been proposed, and one improvement direction is to decrease the transition time and to increase the valid duty period. FIG. 1 shows a circuit diagram of a PS-FB converter having a current-doubler rectifier (CDR) filter. In FIG. 1, the PS-FB converter having the CDR filter 1 includes a full-bridge switching circuit 11, a transformer ($T_1$) 12, a CDR filter 13, a resonant inductor $L_r$, and a coupling capacitor Cc, wherein the coupling capacitor Cc and the resonant inductor $L_r$ are electrically connected between a first output terminal of the full-bridge switching circuit 11 and a first terminal of a primary winding of the transformer $T_1$ in series, and the PS-FB converter 1 can increase an output current thereof to two times of that of the above-mentioned PS-FB converter having a one-inductor filter. But the PS-FB converter 1 is not for help in shortening transition time. As shown in FIG. 1, the full-bridge switching circuit 11 has four power switches $Q_1$-$Q_4$ (wherein each power switch includes a body diode ($D_1$-$D_4$) and a body capacitor ($C_{01}$-$C_{04}$)), a first and a second input terminals receiving a DC input voltage $V_{dc}$, the first output terminal A and the second output terminal B. There is a voltage difference $V_{AB}$ between these two output terminals. The transformer $T_1$ has the primary winding and a secondary winding (its turn ratio is $n=N_p/N_s$). A cross voltage of the primary winding is $v_p$, a cross voltage of the secondary winding is $v_s$, a current flows through the primary winding is $i_p$, a current flows through the secondary winding at Phase-I is $i_{s1}$, a current flows through the secondary winding at Phase-II is $i_{s2}$, and a current flows through the load is $i_o$. The CDR filter 13 includes a first diode $D_{s1}$, a second diode $D_{s2}$, a first inductor $L_1$, a second inductor $L_2$, and a load, wherein the load is a battery pack, and has a cross voltage or an output voltage $V_B$.

A time period of the above-mentioned voltage difference $V_{AB}$ is a sum of a transition period and a valid duty period, and the sum is a fixed value. Thus, when a transition time is decreased to result in a decrease of the transition period, a valid duty period is increased. Shortening the transition time to enhance the efficiency of PS-FB converter's power capability is still the most efficient and feasible method, and thus how to decrease the transition time of the PS-FB converter to enhance the efficiency of PS-FB converter's power capability are important aspects for development in the field.

Keeping the drawbacks of the prior art in mind, and through the use of robust and persistent experiments and research, the applicant has finally conceived of a PS-FB converter with a half-current multiplier output and a control method thereof.

SUMMARY OF THE INVENTION

It is therefore an objective of the present invention to provide a PS-FB converter with a half-current multiplier rectifier (HCMR) filter and a control method thereof, wherein the filter is based on a structure of an autotransformer and can increase an output current of the PS-FB converter to a 1.5 times of an output current of the filter, the converter can cause a primary side current of its main transformer to have a relatively lower transition level and a relatively shorter transition time.

In accordance with the first aspect of the present invention, a phase-shifted full-bridge converter includes a full-bridge switching circuit having a first and a second output terminals, a main transformer having a primary winding and a secondary winding, each of which has a first and a second terminals, wherein the first terminal of the primary winding is coupled to the first output terminal, and the second terminal of the primary winding is coupled to the second output terminal, a filter including: a first and a second diodes, each of which has an anode and a cathode; and an autotransformer having a first winding, a second winding and a center tap, wherein the anode of the first diode is electrically connected to the anode of the second diode, one end of the first winding and one end of the second winding are both electrically connected to the center tap, the other end of the first winding is electrically connected to the cathode of the first diode and the first terminal of the secondary winding, the other end of the second winding is electrically connected to the cathode of the second diode and the second terminal of the secondary winding, and the center tap and the anode of the first diode have an output voltage therebetween.

In accordance with the second aspect of the present invention, a control method of a phase-shifted full-bridge converter, wherein the phase-shifted full-bridge converter includes a full-bridge switching circuit having a first and a second output terminals, a main transformer having a primary winding and a secondary winding, and coupled to the switching circuit, and an autotransformer having a primary winding, a secondary winding and a center tap, and coupled to the main transformer, includes: when a voltage difference between the first output terminal and the second output terminal is a positive value, a first cross voltage of the secondary winding of the main transformer is larger than 0, and is three times of a second cross voltage of the load, causing an induced common current flowing through the primary winding of the autotransformer to be 0.5 times of a series current flowing through the secondary winding of the autotransformer, and causing an output current flowing into the load from the center tap to be 1.5 times of the series current; and when the voltage difference between the first output terminal and the second output terminal is a negative value, the first cross voltage of the secondary winding of the main transformer is less than 0, and an absolute value of the first cross voltage is three times of the second cross voltage of the load, causing the induced common current flowing through the primary winding of the autotransformer to be 0.5 times of the series current flowing through the secondary winding of the autotransformer, and causing the output current flowing into the load from the center tap to be 1.5 times of the series current.

In accordance with the third aspect of the present invention, a phase-shifted full-bridge converter, wherein the phase-shifted full-bridge converter includes a full-bridge switching circuit having a first and a second output terminals, a main transformer having a primary winding and coupled to the switching circuit, and an autotransformer having a primary winding and coupled to the main transformer, includes providing an induced common current flowing through the primary winding of the autotransformer; and causing the induced common current being reflected to the primary winding of the main transformer to cause a primary side current flowing through the primary winding of the main transformer to increase both slopes of a valid duty cycle and a dead-zone period such that the primary side current has a relatively lower transition level and a relatively shorter transition time.

BRIEF DESCRIPTION OF THE DRAWINGS

Other objectives, advantages and efficacies of the present invention will be described in detail below taken from the preferred embodiments with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purposes of illustration and description only; it is not intended to be exhaustive or to be limited to the precise form disclosed.

I. Description of an Hcmr in PS-FB Converter

Figure 1:
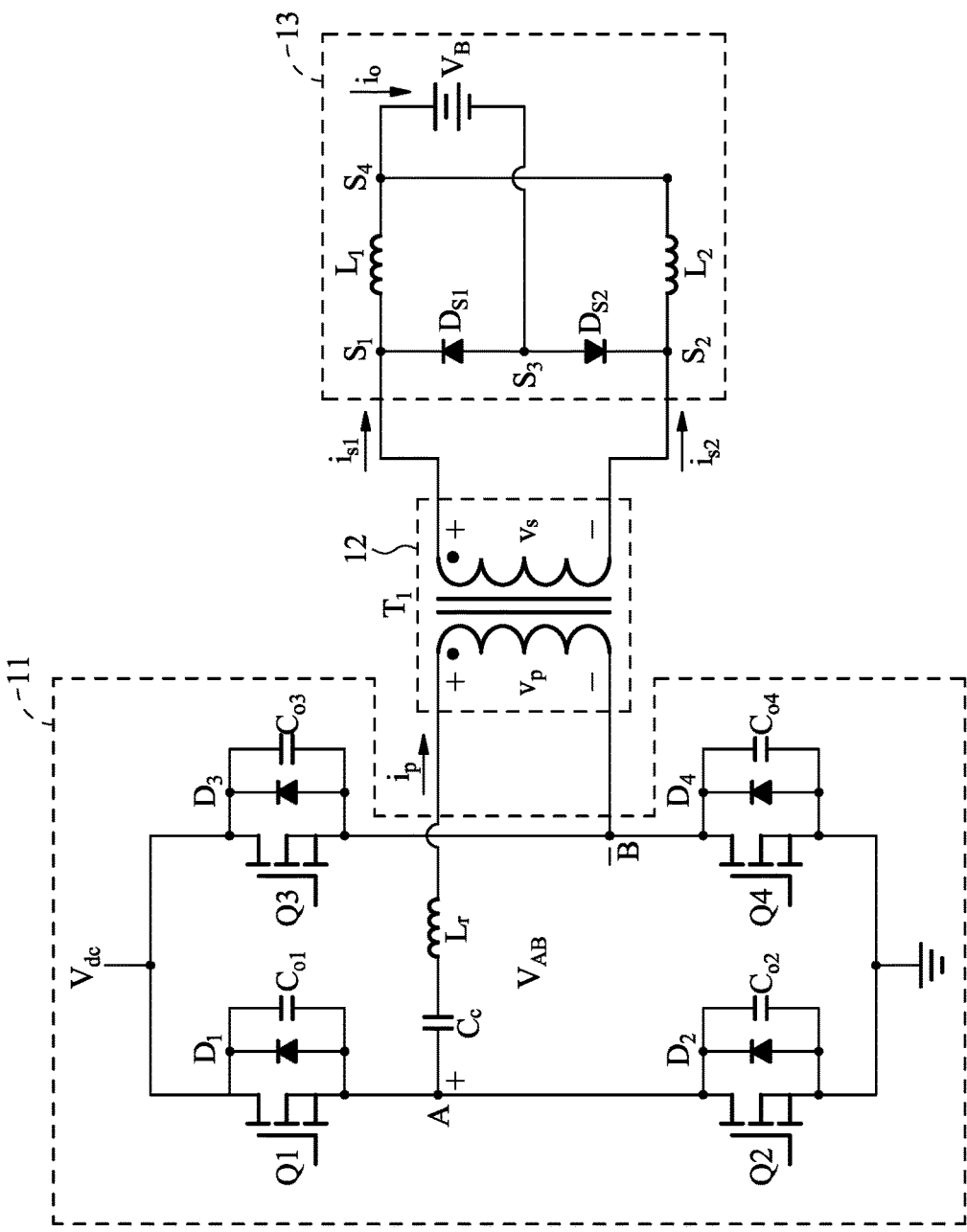
FIG. 1 is a circuit diagram of a PS-FB converter having a current-doubler rectifier (CDR) filter.
Figure 2:
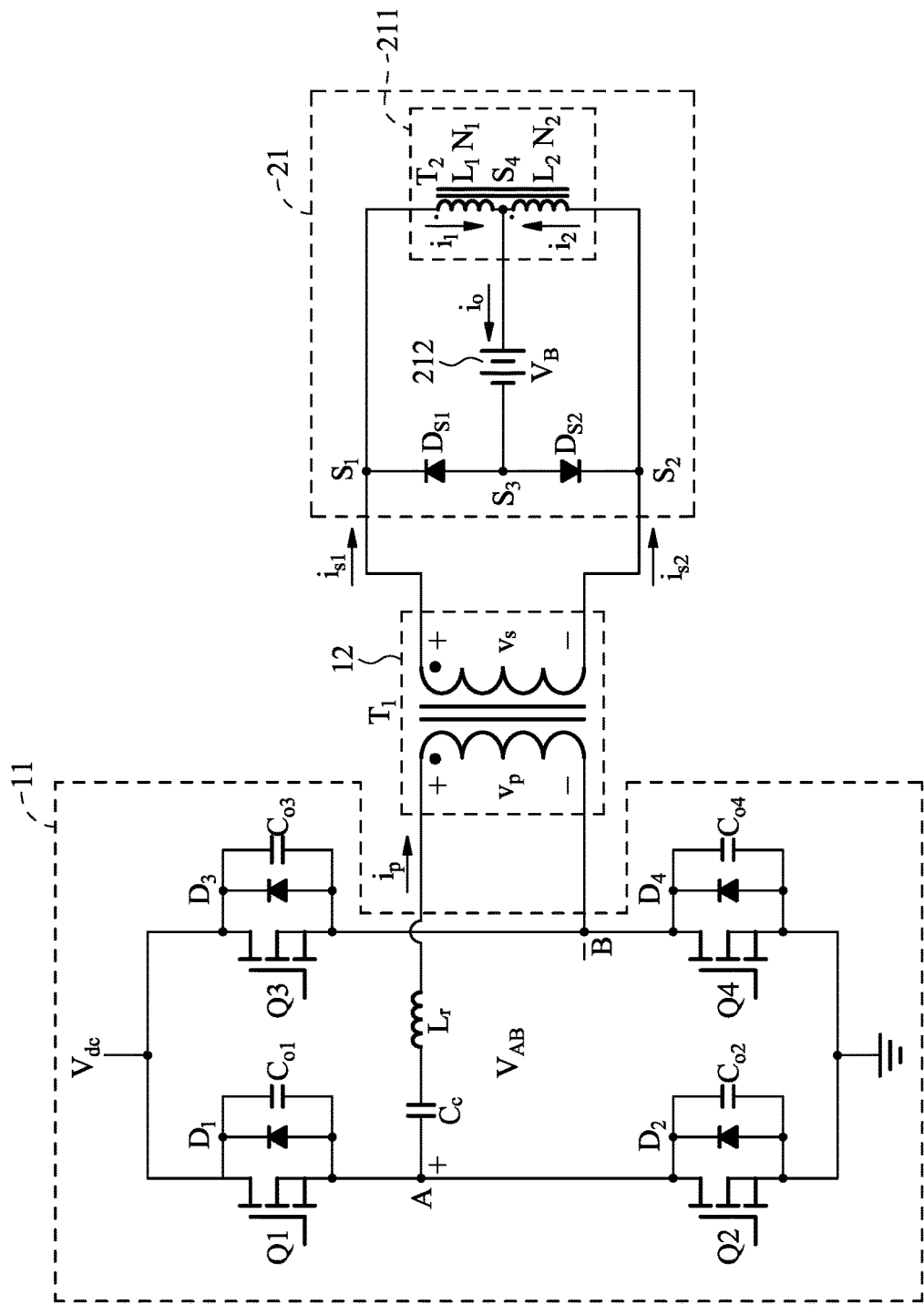
FIG. 2(a) is a circuit diagram of a PS-FB converter having a half-current multiplier output according to the preferred embodiment of the present invention.
FIG. 2(b) is an equivalent circuit diagram of a PS-FB converter as shown in FIG. 2(a) in its phase-I conversion.
FIG. 2(c) is an equivalent circuit diagram of a PS-FB converter as shown in FIG. 2(a) in its phase-II conversion.
Figure 2:
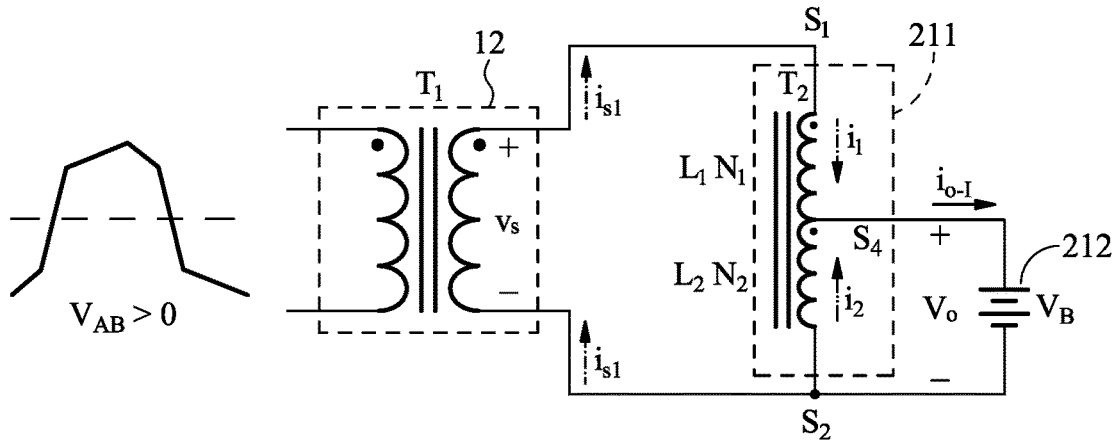
Figure 2:
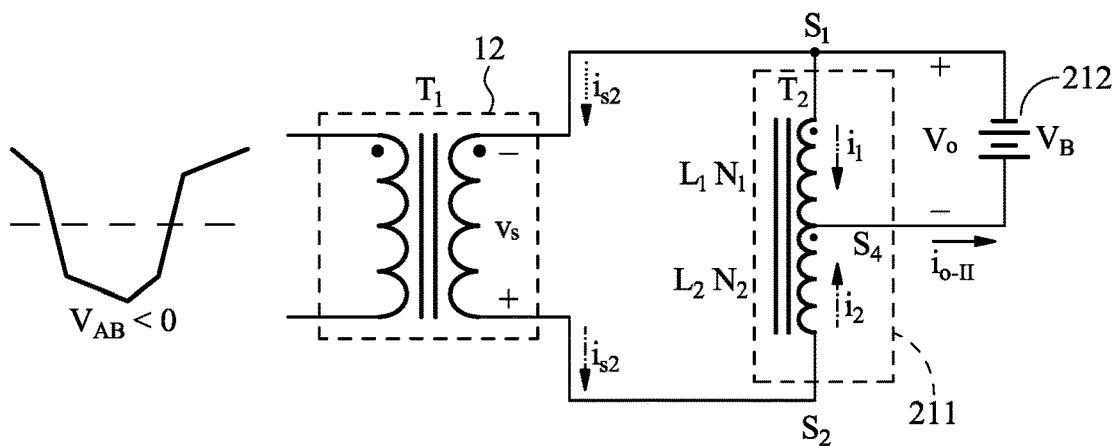

FIG. 2(a) shows a circuit diagram of a PS-FB converter having a half-current multiplier output according to the preferred embodiment of the present invention. In FIG. 2(a), the PS-FB converter having a half-current multiplier output 2 is different from the PS-FB converter 1 as shown in FIG. 1 in that the CDR filter 13 is replaced by a HCMR filter 21. Except for the first diode $D_{s1}$ and the second diode $D_{s2}$ in the HCMR filter 21 being the same as those in the CRD filter 13, the HCMR filter 21 further includes an autotransformer ($T_2$) and a load 212, and now the transformer $T_1$ as shown in FIG. 1 is a main transformer. The load 212 is a battery pack, and has a cross voltage or an output voltage $V_B$ between the nodes $S_4$ and $S_1$. The autotransformer $T_2$ includes a first inductor $L_1$, a second inductor $L_2$ and a center tap located at node $S_4$. The number of turns of the first winding of the first inductor $L_1$ is $N_1$, the number of turns of the second winding of the second inductor $L_2$ is $N_2$, and turns of ratio of $T_2$ is $n=N_1/N_2$. The first (series/primary) winding and the second (common/secondary) winding are identical, and their functions are exchanged according to the polarity transformation of terminal voltage $V_{AB}$. The current flows through the first inductor $L_1$ is $i_1$, the current flows through the second inductor $L_2$ is $i_2$, and a sum of $i_1$ and $i_2$ is the output current $i_o$ flows through the load 212. On the primary side of the main transformer T1, it has a primary winding with a cross voltage of $v_p$, on the secondary side of the main transformer T1, it has a secondary winding with a cross voltage of $v_s$, the full-bridge switching circuit 11 has two pairs of power switches $Q_1$-$Q_4$, in which body capacitors ($C_{01}$-$C_{04}$) and the resonant inductor $L_r$ formed a resonant tank, thereby achieving phase-shifted ZVS. There are a Phase-I conversion and a Phase-II conversion in the PS-FB converter with HCMR.

FIG. 2(b) is an equivalent circuit diagram of a PS-FB converter as shown in FIG. 2(a) in its phase-I conversion. The above-mentioned phase-I conversion is shown in FIG. 2(b), wherein $V_B=V_o$(or $v_o$), $V_{AB}>0$, and $v_s>0$.

FIG. 2(c) is an equivalent circuit diagram of a PS-FB converter as shown in FIG. 2(a) in its phase-II conversion. The above-mentioned phase-II conversion is shown in FIG. 2(c), wherein $V_B=V_o$(or $v_o$), $V_{AB}<0$, and $v_s<0$.

According to Faraday's law and Ampere's law, the basic characteristics of an autotransformer 211 can be described by using the autotransformer structure in the phase-I conversion topology in FIG. 2(b), which is given by:

$$\frac{v_o}{v_s - v_o} = \frac{N_2}{N_1} \text{ and} \quad (1)$$

$$N_1 i_1 = N_2 i_2 \quad (2)$$

where the induced current $i_2$ in common winding $N_2$ will be $$i_2 = i_o - i_1 \quad (3)$$

Equations (1)-(3) are used as transformers for general loads. In the present invention, the common winding is always clamped at a certain constant output voltage, such as the battery pack $V_B$ in a charging system. Therefore, in the analysis, the load effect on the common winding should be considered. Since the series and common windings with center tap separation derive from the single-core inductor, it needs to take only selfinductance into account and leakage inductance, which is small near the tap point, can be ignored. The present invention defines the series and common winding inductances as $L_1$ and $L_2$, respectively, while leaving out leakage inductance in the analysis.

A. Behavior of HCMR in Two-Phase Conversion

As described in FIGS. 2(b) and (c), all symbols are in the form of subscripts with "I" or "II," to mark their conversion states. Also, the turns ratio of $T_2$ is defined as $a_I=N_1/N_2$ and $a_{II}=N_2/N_1$ for phase-I and phase-II conversions, respectively. They are equal, as $a_I=a_{II}=1$ for symmetrical conversion. In the phase-I conversion, shown in FIG. 2(a), when $V_{AB}>0$ and $v_s>0$, diode $D_{s2}$ is turned on, causing secondary current $i_{s1}(t)$ of $T_1$, that is current $i_1(t)$ flowing into battery pack $V_B$ through series winding $N_1$. Current $i_2(t)$, induced in common winding, clamped at $V_B$, and half current $i_1(t)$, also flows into the battery pack. The sum of $i_1(t)$ and $i_2(t)$ equals the output current and 1.5 times current $i_1(t)$, which will be verified in the subsequent analysis. Conversely, for phase-II conversion shown in FIG. 2(b), $V_{AB}>0$ and $v_s<0$, diode $D_{s1}$ turns on and takes over the opposite HMCR function. Windings, $N_1$ and $N_2$ of $T_2$, become common and series windings, respectively, in which series current $i_2(t)$ equals the secondary current $i_{s2}(t)$ of $T_1$ and induced common current $i_1(t)$ is half current $i_2(t)$. Similarly, the output current $i_{o-II}$ flowing into load battery is the sum of $i_2(t)$ and $i_1(t)$ and also equals 1.5 times current $i_2(t)$, as predicted previously. In other words, whatever the conversion phase, output current $i_o(t)$ is always the sum of two currents $i_1(t)$ and $i_2(t)$, resulting in $i_{o-I}=i_{o-II}$.

B. Dynamic Behaviors of PS-FB Converter with HCMR

Figure 3:
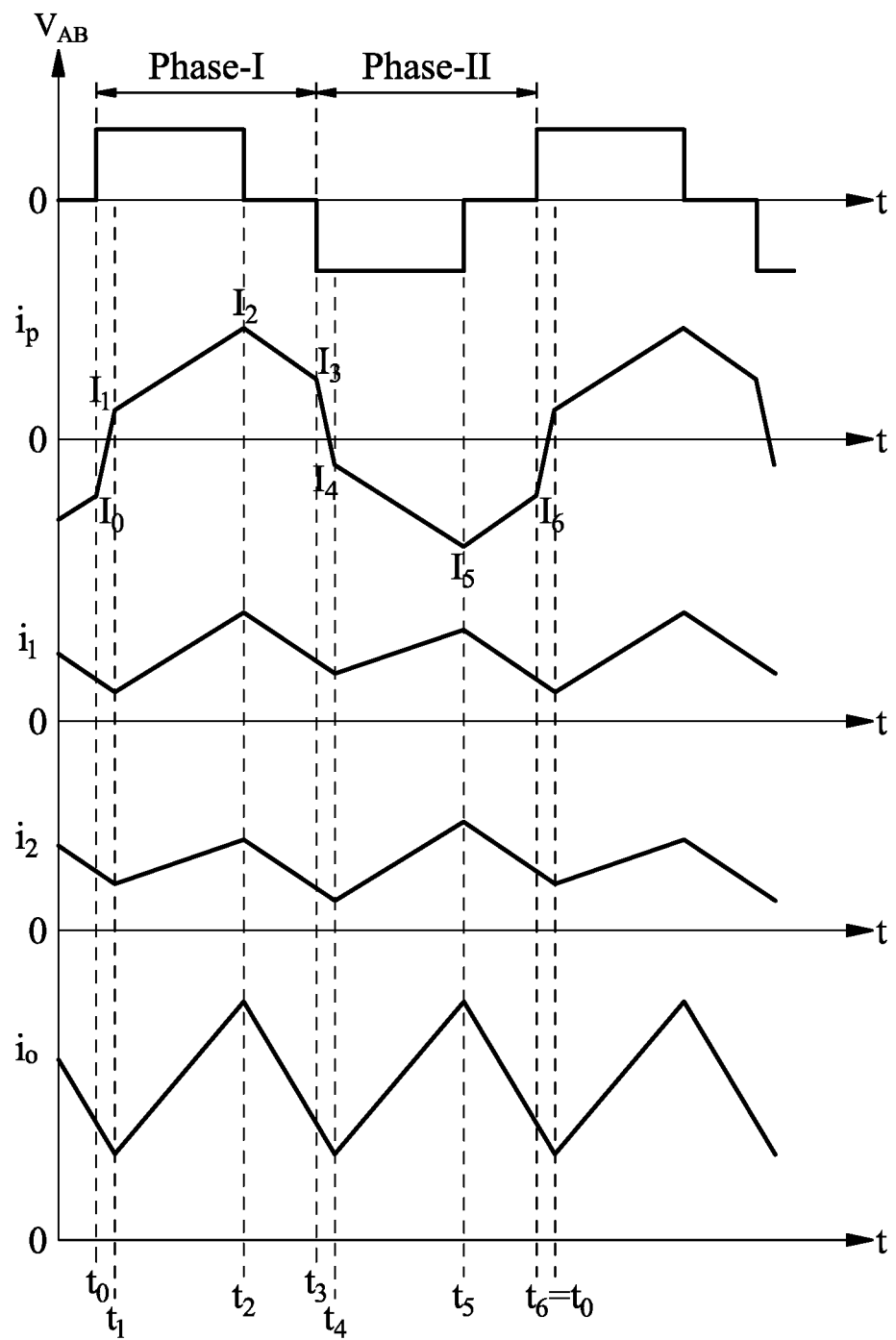
FIG. 3(a) shows predictive state waveforms in CCM of the PS-FB converter as shown in FIG. 2(a).
FIG. 3(b) shows predictive state waveforms in DCM of the PS-FB converter as shown in FIG. 2(a).
Figure 3:
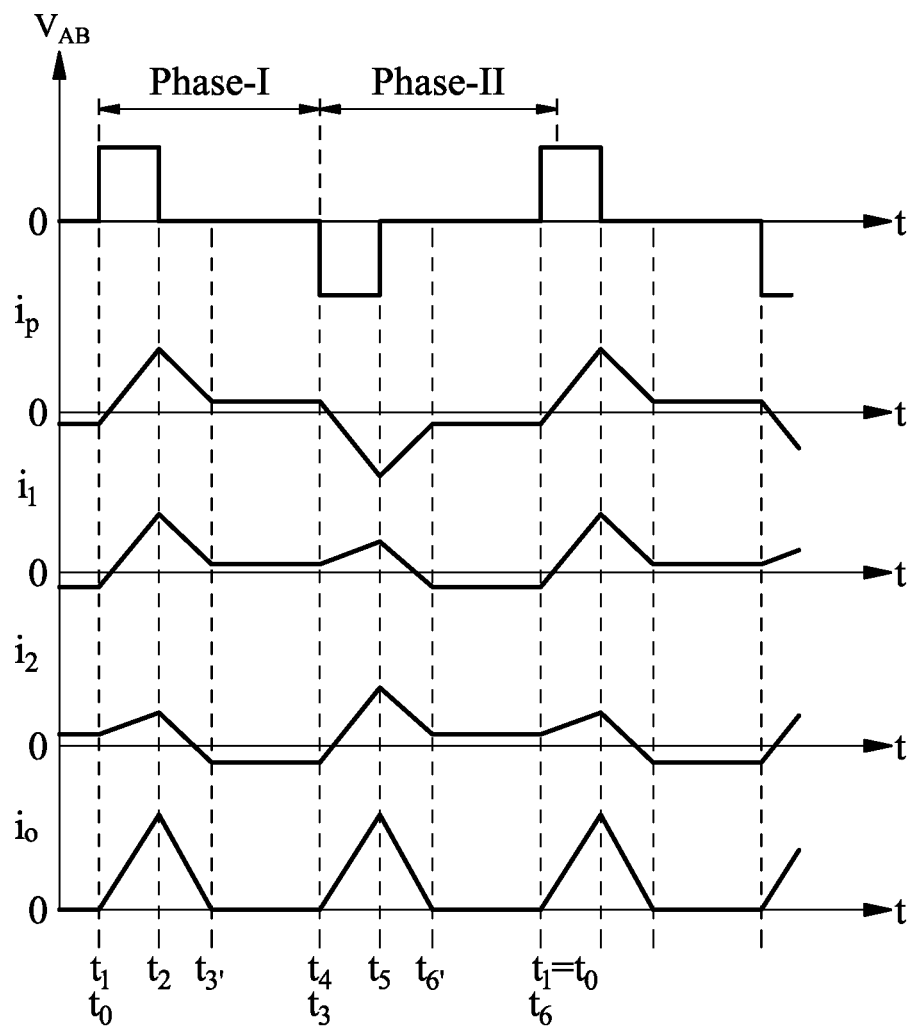

FIG. 3(a) shows predictive state waveforms in CCM of the PS-FB converter as shown in FIG. 2(a), and FIG. 3(b) show predictive state waveforms in DCM of the PS-FB converter as shown in FIG. 2(a), in which whole behaviors include phase-I (t0≤t≤t3) and phase-II (t3≤t≤t6) conversions. In FIG. 3(a) of phase-I conversion, the primary current $I_p$ in the CCM is similar to that with one inductor rectifier or half the CDR filter. A significant difference is that the amount of change in $i_p$ with HCMR during rising ($t_0$, t1) and falling ($t_3$, $t_4$) transitions is not exceptionally large, as the transition period is short and transition level low. Another reason is that induced current $i_2(t)$ from $T_2$ endows $i_p$ a steeper upward slope during the current delivery period ($t_1$, $t_2$), but it drops to the transition level with a significant slope during dead time ($t_3$, $t_4$). In other words, this causal relationship makes transition level low and transition time short. The variation of the waveform can also be understood from its relationship with waveforms of $i_1$ and $i_2$, as shown in FIG. 3(a). In the dead-zone period ($t_2$, $t_3$), $i_{p-I}$ quickly dropping from $I_2$ to $I_3$ is due to the slope sum of $i_1(t)$ and $i_2(t)$, both of which are with the same slope. Waveforms present in conversion phase-I will appear oppositely in the phase-II conversion in ($t_3$<t<$t_6$), in which the function of HCMR changes and $i_2(t)$ and $i_1(t)$ become series and common currents in $T_2$, respectively.

For the case of DCM, as shown in FIG. 3(b), there is almost no transition period in ($t_0$, $t_1$), resulting in $t_1 \approx t_0$, though with a small negative shallow current at t0. Primary current rises from during valid duty period ($t_1$, $t_2$), achieved almost entirely during terminal $V_{AB}$ period. The slope of $i_{p-I}$ is equivalent to that of $i_1(t)$. After entering into the dead-zone period ($t_2$, $t_3$), $i_{p-I}$ rapidly drops to a small positive level in the middle period at $t=t_3'$, due to the slope sum of $i_1(t)$ and $i_2(t)$, both at the same slope. Even if a small positive current $i_{p-I}$ exists up to $t_3$, it still can turn on the body diode first to lead lagging-leg switch to conduct near ZVS, thereby initiating conversion phase-II. In other words, the slope variations of current waveforms in the DCM appear to be similar to those in the CCM and the output current $i_{o-I}$ is still 1.5 times $i_1(t)$. DCM waveforms present in the phase-I conversion also reversely appear in the phase-II conversion. Moreover, ZVS seems to be able to adequately perform in both CCM and DCM in any conversion phase.

II. Analysis of PS-FB Converter with HCMR

The present invention analyzes the scenario of PS-FB converter with HCMR in the CCM. In the case of DCM, there is a comment after each phase of CCM discussion. It is assumed that the PS-FB converter operates under a steady state and all components are ideal ones. A lead-acid battery (LAB) is used as the charging load connecting at the center S4 of the HCMR. All assumptions in Section I are still available in this section. This analysis is based on the time base of the predicted waveform in FIGS. 3(a)-(b). The phase-I conversion ($t_0 < t < t_3$) is shown in FIGS. 4(a) and (b), and the phase-II conversion ($t_3 < t < t_6$) is shown in FIGS. 5(a) and (b).

A. Phase-I Conversion: ($t_0 \leq t < t_3$)

Figure 4:
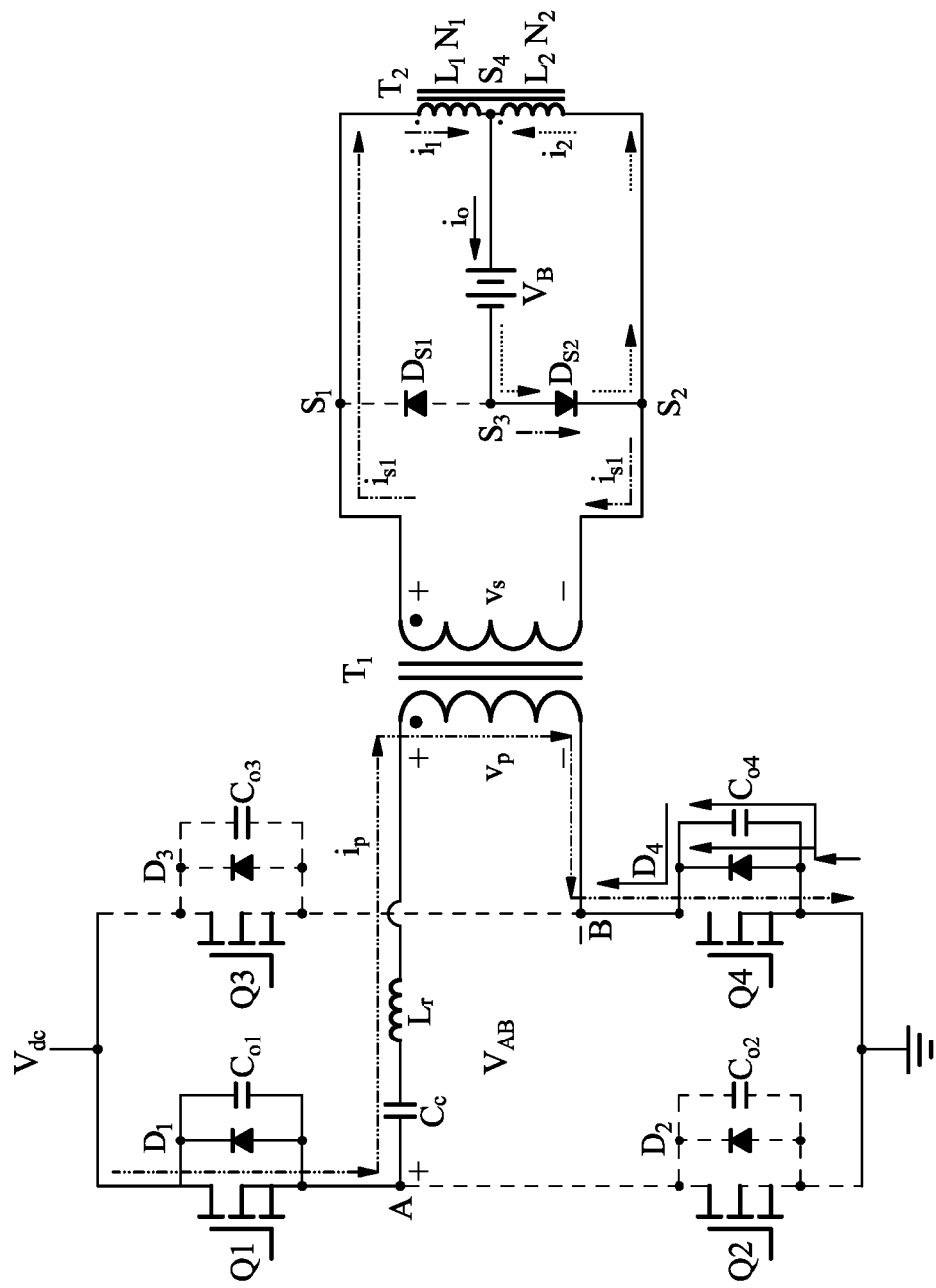
FIG. 4(a) shows circuit dynamics of transition state and current delivery in CCM in the Phase-I conversion of the PS-FB converter as shown in FIG. 2(a).
FIG. 4(b) shows circuit dynamics of freewheeling state in CCM in the Phase-I conversion of the PS-FB converter as shown in FIG. 2(a).
Figure 4:
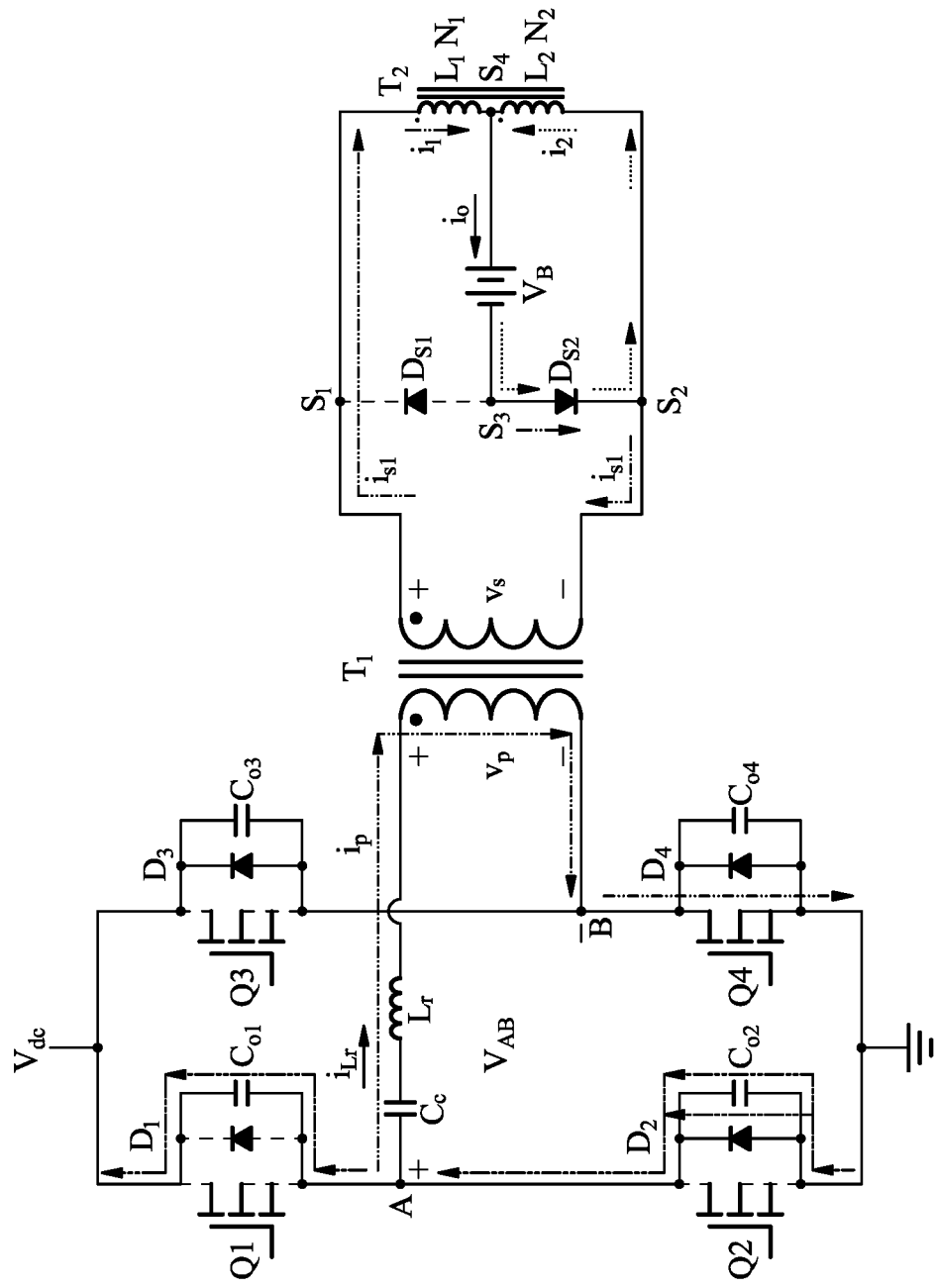
Figure 5:
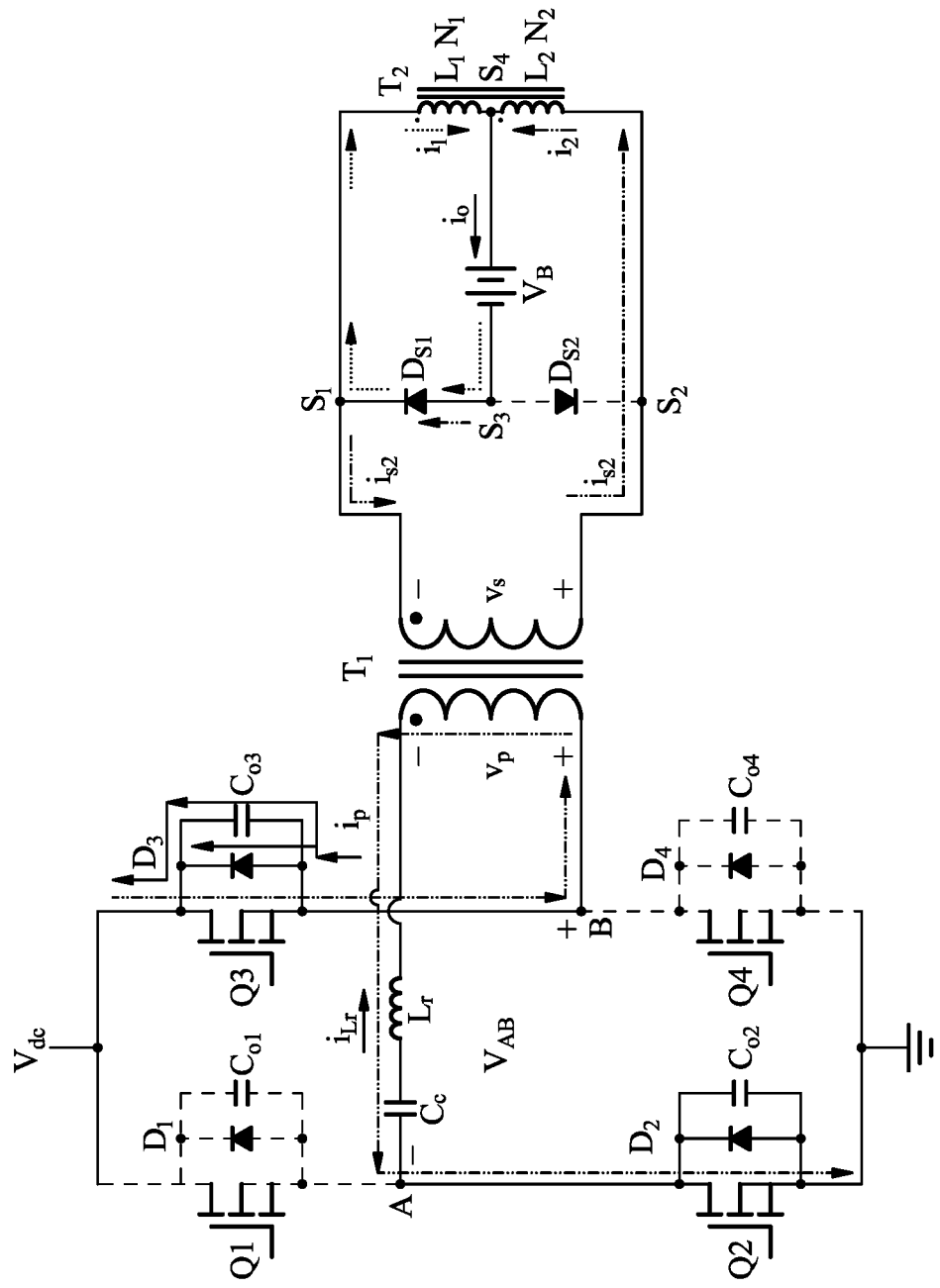
FIG. 5(a) shows circuit dynamics of transition state and current delivery in CCM in the Phase-II conversion of the PS-FB converter as shown in FIG. 2(a).
FIG. 5(b) shows circuit dynamics of freewheeling state in CCM in the Phase-II conversion of the PS-FB converter as shown in FIG. 2(a).
Figure 5:
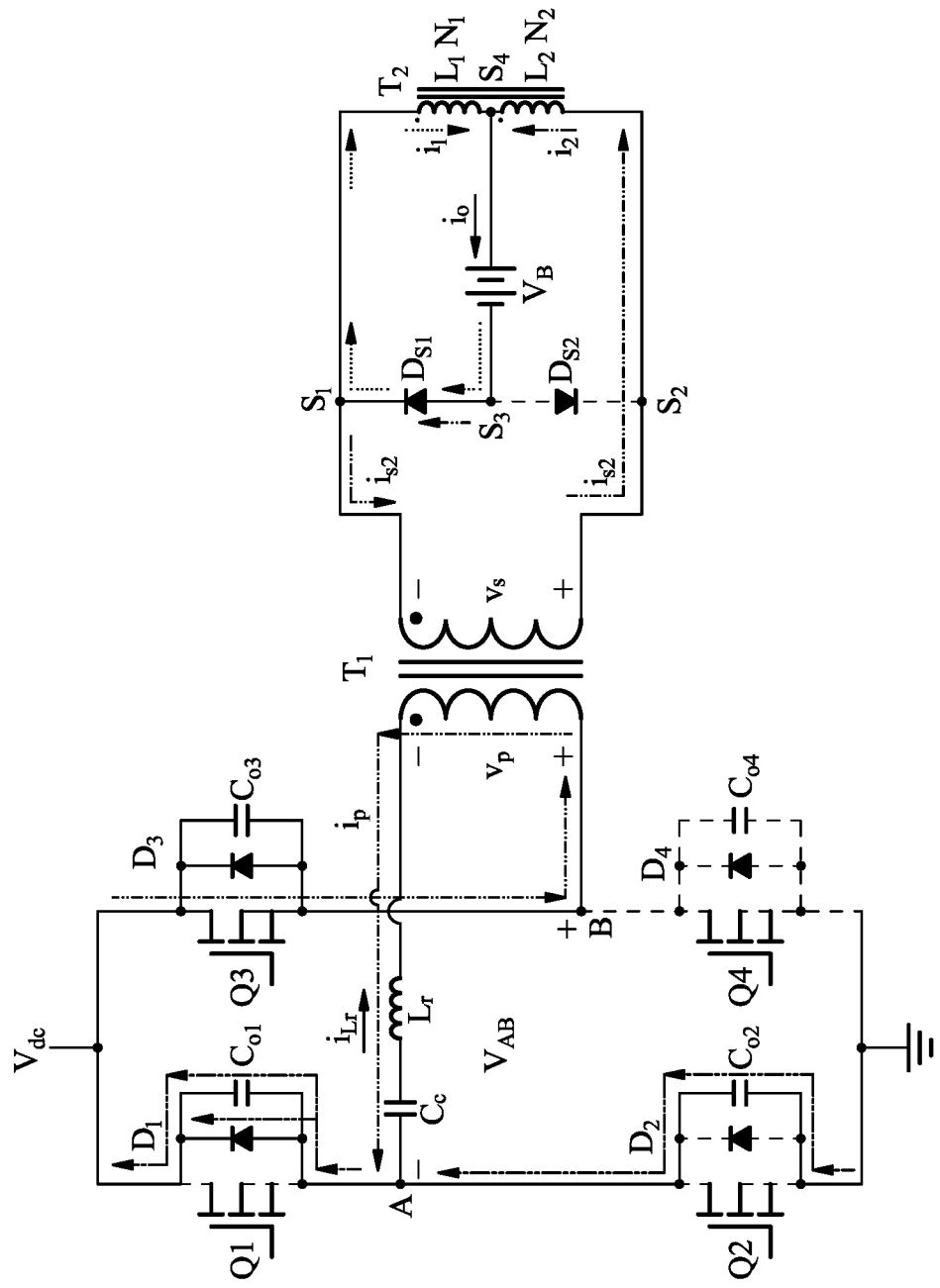

In the phase-I conversion, as shown in FIGS. 4(a) and (b), HCMR has a function, as shown in FIG. 2(b). In the case of CCM, as shown in FIG. 3(a), there are three states, namely, transition, current delivery, and freewheeling.

1) State Transition and Current Delivery ($t_0 \leq t < t_2$): In FIG. 4(a), $Q_4$ turns on at ZVS when (after current flows through $D_4$). When $t > t_0$, $Q_1$ and $Q_4$ turn on, leading to the primary terminal voltage $V_{AB} > 0$ and secondary voltage $v_s > 0$ at $T_1$. Series current $i_{1-I}(t)$ ($i_1$) and induced common current $i_{2-I}(t)$ ($i_2$) are combined to become the output current flowing into the load ($i_o$), i.e., $i_{o-I}(t) = i_1 - I + i_{2-I}(t)$, where the subscript "I" denotes the phase-I conversion.

a) In the Primary Side of $T_1$: In FIGS. 3(a) and 4(a), the primary current $i_{p-I}(i_p)$ in the transition state is given by $$i_{p-I}(t) = I_0 + \frac{V_{dc}}{L_r}t \quad (4)$$

for $t_0 \leq t < t_1$, where $i_{p-I}(t_0) = I_0$ and $L_r$ is the resonant inductance, including the leakage inductance of $T_1$. In the valid duty period, the primary current $i_p$ will be $$i_{p-I}(t) = I_1 + \frac{V_{dc} - v_p}{n^2 L_1}t \quad (5)$$

$$= I_1 + \frac{1}{n} \cdot \frac{v_s - V_B}{L_1}t$$

for $t_1 \leq t < t_2$, where $i_{p-I}(t_1) = I_1$; $n = N_p/N_s$ the turns ratio of $T_1$, and $L_1$ is the inductances of the series winding of $T_2$.

b) In the Secondary Side of $T_1$: The series and common currents $i_{1-I}(t)$ and $i_{2-I}(t)$ in $T_2$ can be, respectively, given by $$i_{1-I}(t) = i_{s1}(t) \quad (6)$$

$$= nI_1 + \frac{v_s - V_B}{L_1}t$$

$$i_{2-I}(t) = \frac{nI_1}{2} + a_I\left(\frac{v_s - V_B}{L_1}\right) - \frac{V_B}{L_2}t \quad (7)$$

where $L_2$ is the inductance of common winding of $T_2$, $a_I = N_1/N_2$ the turns ratio of $T_1$, and $V_B$ is the battery voltage.

In (7), the third term is attributed to the battery $V_B$, which is always clamped on the common winding in the present invention's scenario. From (3) and (4), the output current $i_{o-I}(t)$ will be $$i_{o-I}(t) = i_{1-I}(t) + i_{2-I}(t) \quad (8)$$

$$= \frac{3nI_1}{2} + (1 + a_I) \cdot \frac{v_s - V_B}{L_1}t - \frac{V_B}{L_2}t$$

If the output current $i_{o-I}$ is to be 1.5 times the series current (filter current) $i_{1-I}(t)$, the secondary voltage $v_s$ in $T_1$ should be designed to be $3V_B$. Therefore, under a symmetric assumption, let $N_1 = N_2$ and $L_1 = L_2$, and it derives from (8)

$$i_{o-I}(t) = \frac{3nI_1}{2} + \left(\frac{2v_s - 3V_B}{L_1}\right)t \quad (9)$$

$$= (1.5) \cdot \left(nI_1 + \frac{2V_B}{L_1}t\right)$$

$$= (1.5) \cdot i_{1-I}(t)$$

Equation (9) shows that the output current can be 1.5 times series current $i_{1-I}(t)$ if $v_s = 3V_B$. Therefore, (4)-(9) are consistent with the waveforms during the phase-I conversion, as shown in FIG. 3(a).

Comment on DCM Mode: In the DCM, as shown in FIG. 3(b), there is a negative primary shallow current before $t_0$, which will conduct body diode $D_4$ first before turning on $Q_4$ at ZVS. In this case, both $Q_1$ and $Q_4$ are conducted with shallow current stress, with little transition loss, where $t_1 \approx t_0$. The transition period ($t_0$, $t_1$) seems to be negligible, which causes primary current $i_{p-I}$ to be delivered almost within the $V_{AB}$ period ($t_0$, $t_2$), where the valid duty period ($t_1$, $t_2$) is quite close to the $V_{AB}$ period.

2) Freewheeling State ($t_2 \leq t < t_3$):

a) In the Primary Side of T1: In FIG. 3(b), when $Q_1$ turns off at $t = t_2$, the body capacitor of $Q_2$ releases charge while being combined with $C_o1$ and resonant inductor $L_r$ to establish resonance, turning on $Q_2$ at ZVS. Meanwhile, $V_{AB} = 0$ and $Q_2$ and $Q_4$ are freewheeling and primary current $i_{p-I}$ falls from $t_2$ to $t_3$, in which diode $D_{s2}$ continues to help induced current $i_2$ in pulling primary current. The primary current $i_{p-I}(t)$ is given by $$i_{p-I}(t) = I_2 - \frac{1}{n} \cdot \frac{V_B}{L_1}t - \frac{1}{n} \cdot \left(\frac{1}{a_I} \cdot \frac{V_B}{L_2}\right)t \quad (10)$$

for $t_2 \leq t < t_3$, where $i_{p-I}(t_2) = I_2$ from (2). The third term in (10) is the induced common current from the series winding $N_1$ of $T_2$.

b) In the Secondary Side of $T_1$: During the freewheeling state, the currents in the series $N_1$ and common $N_2$ windings are, respectively, given by $$i_{1-I}(t) = nI_2 - \frac{V_B}{L_1}t - \frac{1}{a_I} \cdot \frac{V_B}{L_2}t \text{ and} \quad (11)$$

$$i_{2-I}(t) = \frac{nI_2}{2} - \frac{V_B}{L_2}t - a_I \frac{V_B}{L_1}t \quad (12)$$

for $t_2 \leq t < t_3$. The third terms in (11) and (12) are the mutual induced currents in $T_2$, respectively. The output current $i_{o\text{-}I}$ is $$i_{o-I}(t) = i_{1-I}(t) + i_{2-I}(t) \tag{13}$$

$$= \frac{3nI_2}{2} - (1+a_I)\frac{V_B}{L_1}t - \left(1+\frac{1}{a_I}\right)\cdot\frac{V_B}{L_2}t$$

for $t_2 \leq t < t_3$. If $L_1 = L_2$ and $a_I = 1$, there are $$i_{o-I}(t) = \frac{3nI_2}{2} - 4\frac{V_B}{L_1}t \tag{14}$$

for $t_2 \leq t < t_3$. Equation (14) proves that the primary current $i_{p\text{-}I}$ can fall deeply to a low current level $I_3$ due to the second term.

Comment on DCM mode: In the DCM, as shown in FIG. 3(b), during $Q_2$ and $Q_4$ in freewheeling, $i_{p\text{-}I}$ in dead zone ($t_2$, $t_3$) will drop to a superficial level of $t=t_3'$, at a falling slope that is the sum of $i_1$ and $i_2$ and with the current remaining unchanged until $t_3$. This small current will first flow through the body diode at the moment before triggering Q2 at ZVS to start the phase-II conversion.

B. Phase-II Conversion: ($t_3 \leq t < t_6$)

FIGS. 5(a)-(b) show the circuit dynamics, with $V_{AB} < 0$ and $v_s < 0$, for Phase-II conversion. Due to the change in the polarity of the terminal $V_{AB}$, the two winding functions of HCMR are interchanged according to the function of FIG. 2(b). All description and derivations are reverse to the counterparts in the phase-I conversion. Therefore, only the relevant formula and a brief description of reference are shown.

1) State Transition and Current Delivery ($t_3 \leq t < t_5$): In FIG. 5(a), $Q_3$ turns on at ZVS (after current as shown flowing therethrough), when $Q_2$ and $Q_3$ come into force, leading to terminal voltage $V_{AB} < 0$ and secondary voltage $v_s < 0$. Then, the function of HCMR follows, as shown in FIG. 2(b). In FIGS. 5(a)-(b), series current $i_{2\text{-}II}(t)$ (or $i_2$) and induced common current $i_{1\text{-}II}(t)$ (or $i_1$) will be combined into the load, with output current reaching $i_{o\text{-}II}(t) = +i_{2\text{-}II}(t)$, where subscript "II" denotes the phase II conversion.

a) In the Primary Side of $T_1$: From FIG. 5(a), the primary current $i_{p\text{-}II}$ in the transition state is given by $$i_{p-II}(t) = I_3 - \frac{V_{dc}}{L_r}t \tag{15}$$

for $t_3 \leq t < t_4$, where $i_{p\text{-}II}(t_3) = I_3$. In valid duty, the primary current $i_{p\text{-}II}$ is $$i_{p-II}(t) = I_4 - \frac{1}{n}\cdot\frac{v_s - V_B}{L_2}t \tag{16}$$

for $t_4 \leq t < t_5$, where $i_{p\text{-}II}(t_4) = I_4$.

b) On the Secondary Side of $T_1$: The series and common currents $i_{2\text{-}II}(t)$ and $i_{1\text{-}II}(t)$ are, respectively $$i_{2-II}(t) = i_{s2}(t) \tag{17}$$

$$= nI_2 + \frac{v_s - V_B}{L_2}t \text{ and}$$

-continued $$i_{1-II}(t) = \frac{nI_4}{2} + a_{II}\left(\frac{v_s - V_B}{L_2}\right) - \frac{V_B}{L_1}t \tag{18}$$

for $t_4 \leq t < t_5$, where the turns ratio $a_{II} = N_2/N_1$ of $T_2$. From (17) and (18), there is an output current $i_{o\text{-}II}(t)$ given by $$i_{o-II}(t) = i_{1-II}(t) + i_{2-II}(t) \tag{19}$$

$$= \frac{3nI_4}{2} + (1+a_{II})\cdot\frac{v_s - V_B}{L_2}t - \frac{V_B}{L_1}t$$

for $t_4 \leq t < t_5$.

Under symmetric conversion and let $v_s = 3V_B$, from (19) we get $$i_{o-II}(t) = \frac{3nI_4}{2} + \left(\frac{2v_s - 3V_B}{L_2}\right)t \tag{20}$$

$$= (1.5)\cdot\left(nI_4 + \frac{2V_B}{L_2}t\right)$$

$$= (1.5)\cdot i_{2-II}(t)$$

for $t_4 \leq t < t_5$. Equation (20) proves that the output current $i_{o\text{-}II}(t)$ is also 1.5 times the series current $i_{2\text{-}II}(t)$. It is confirmed from (10) and (20) that in any conversion phase, the two output currents $i_{o\text{-}I}(t)$ and $i_{o\text{-}II}(t)$ are equal, that is $$i_{o-I}(t) = i_{o-II}(t) \tag{21}$$

Comment on DCM mode: In the DCM, as shown in FIGS. 3(b) and 5(a)-(b), primary current keeps a small shallow current from $t_3'$ through $t_3$, which turns on body diode $D_3$ first before triggering $Q_3$ with ZVS. When $t > t_3$, $Q_2$ and $Q_3$ will transition with low shallow current stress, leading to little transition loss in ($t_3$, $t_4$). Due to $t_3 \approx t_4$, the transition period appears to be negligible, which results in power delivery during almost entire $V_{AB}$ period ($t_3$, $t_5$), because the valid period ($t_3$, $t_5$) is quite close to the $V_{AB}$ period.

2) Freewheeling State ($t_5 \leq t < t_6$): As shown in FIGS. 3(b) and 5(b), when switch $Q_2$ turns off at $t = t_5$, the body capacitor $C_{o1}$ of $Q_1$ discharges and resonance is established in conjunction with $L_r$ and $C_{o2}$ to turn $Q_1$ on at ZVS, while with $V_{AB} = 0$, $Q_1$ and $Q_3$ continue flowing, leading $i_{p\text{-}II}$ to fall until $t = t_6$. There is $$i_{p-II}(t) = I_5 + \frac{1}{n}\cdot\frac{V_B}{L_2}t + \frac{1}{n}\cdot\left(\frac{1}{a_{II}}\cdot\frac{V_B}{L_1}\right)t \tag{22}$$

for $t_5 \leq t < t_6$, where $i_{p\text{-}II}(t_5) = I_5$ from (13), and the third term in (22) is the induced current from the series winding $N_2$ of $T_2$. In this freewheeling state, the currents in series winding $N_2$ and common winding $N_1$ will be $$i_{2-II}(t) = -nI_5 - \frac{V_B}{L_2}t - \frac{1}{a_{II}}\cdot\frac{V_B}{L_1}t \text{ and} \tag{23}$$

$$i_{1-II}(t) = -\frac{nI_5}{2} - \frac{V_B}{L_1}t - a_{II}\frac{V_B}{L_2}t \tag{24}$$

for $t_5 \le t < t_6$. The third terms in (23) and (24) are due to the mutual induced currents in $T_2$. Output current $i_{o-II}$ will then be $$i_{o-II}(t) = i_{2-II}(t) + i_{1-II}(t) \quad (25)$$

$$= -\frac{3nI_5}{2} - (1+a_{II})\frac{V_B}{L_2}t - \left(1+\frac{1}{a_{II}}\right)\cdot\frac{V_B}{L_1}t$$

for $t_5 \le t < t_6$. If $L_1 = L2$ and $a_{II} = 1$, we then have $$i_{o-II}(t) = -\frac{3nI_5}{2} - 4\frac{V_B}{L_2}t \quad (26)$$

for $t_5 \le t < t_6$, where $I_5$ on the primary current is negative.

Comment on DCM Mode: About FIG. 3(b), in the case of DCM, during $Q_1$ and $Q_3$ in the freewheeling state, $i_{p-II}$ in dead zone will fall rapidly to a shallow negative current at $t=t_6'$, with a falling slope sum of $i_1$ and $i_2$; and stay unchanged until $t_6$. Similarly, this current will turn on body diode $D_4$ first before triggering $Q_4$ at ZVS at $t=t_6$ to start the next phase-I conversion.

C. Cases of $L_1 \ne L_2$ and $v_s \ne 3$ VB

Given $L_1 \ne L_2$, there are two discussions as follows. Taking output current $i_{o-II}$ in the current transfer period of (19) and the dead period of (25) as an example, it is defined as $k \equiv L_1/L_2$. The same result of will also appear in in (14). We use (19) and (25) to describe their impact on the valid duty period and the dead-zone period, respectively. The phenomenon of will also appear in Starting from (19), there is $$i_{o-II}(t) = \frac{3nI_4}{2} + (2k-1)\cdot\frac{V_B}{L_1}t \quad (27)$$

for $t_4 \le t < t_5$ in the valid duty period. From (25), there is $$i_{o-II}(t) = -\frac{3nI_5}{2} - \frac{2(k+1)V_B}{L_1}t \quad (28)$$

for $t_5 \le t < t_6$ in the dead-zone period.

Figure 6:
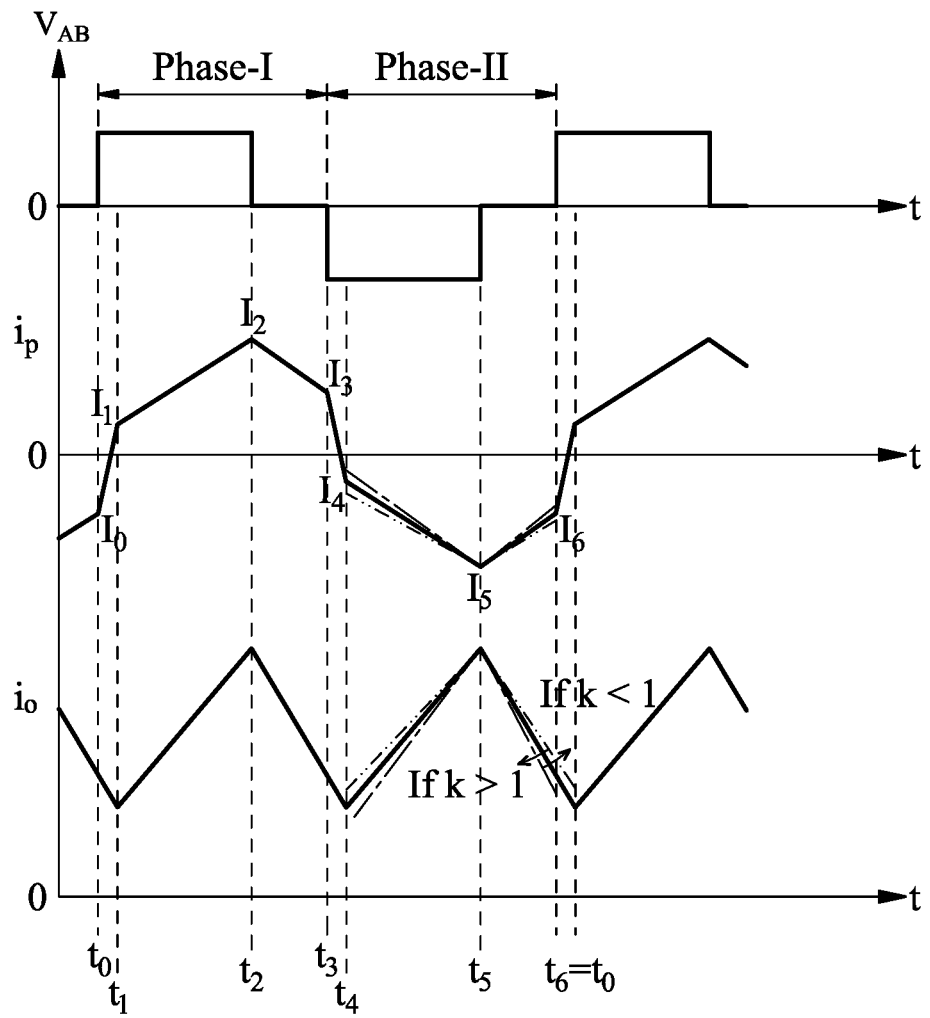
FIG. 6 displays waveforms showing Effect of L1≠L2 on output current of Phase-II of the PS-FB converter as shown in FIG. 2(a).

If k>1, It Means $L_1 > L_2$: In this case, during power delivery ($t_4 \le t < t_5$) and dead zone ($t_5 \le t < t_6$), $i_{o-II}$ will have a steeper slope, resulting in a slightly sharper ripple current than $L_1 = L_2$, as the ripple current is shown in FIG. 6.

If k<1, It Means $L_1 = L_2$: In this case, $i_{o-II}$ in the period will have a slope slightly smaller than $L_1 = L_2$, such as the ripple current slope shown in FIG. 6.

If the secondary voltage $v_s$ is greater than or less than $3V_B$, then with reference to (9) and (20), the slope of the filter current $i_1(t)$ will change, while the slope $(V_B/L_2)t$ of the induced current $i_2(t)$ will remain almost unchanged, so the average value of the output current $i_o(t)$ may not be exactly 1.5 times the filter current $i_1(t)$. Therefore, in the case of symmetry and $v_s = 3V_B$, different output currents depending on the load are mainly affected by the average value of $v_s$, but will still maintain a relative ratio of 1.5 times.

D. Effect of HCMR and CDR on Primary Current

Figure 7:
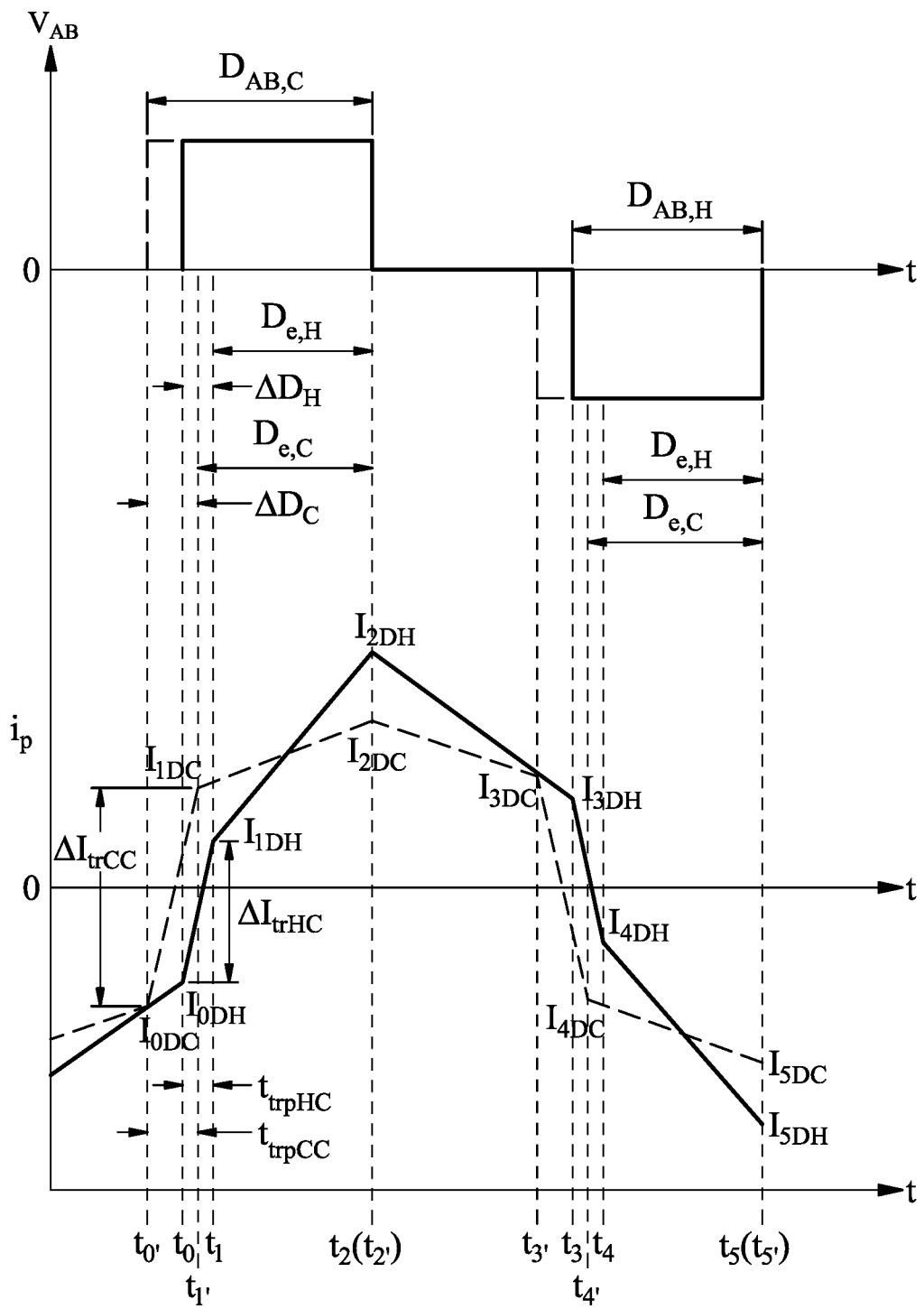
FIG. 7(a) displays waveforms of the predicted voltage difference of two output terminals $V_{AB}$ and the predicted primary side current $i_p(t)$ in CCM of the PS-FB converter as shown in FIG. 1 and FIG. 2(a).
FIG. 7(b) displays waveforms of the predicted voltage difference of two output terminals $V_{AB}$ and the predicted primary side current $i_p(t)$ in DCM of the PS-FB converter as shown in FIG. 1 and FIG. 2(a).
Figure 7B:
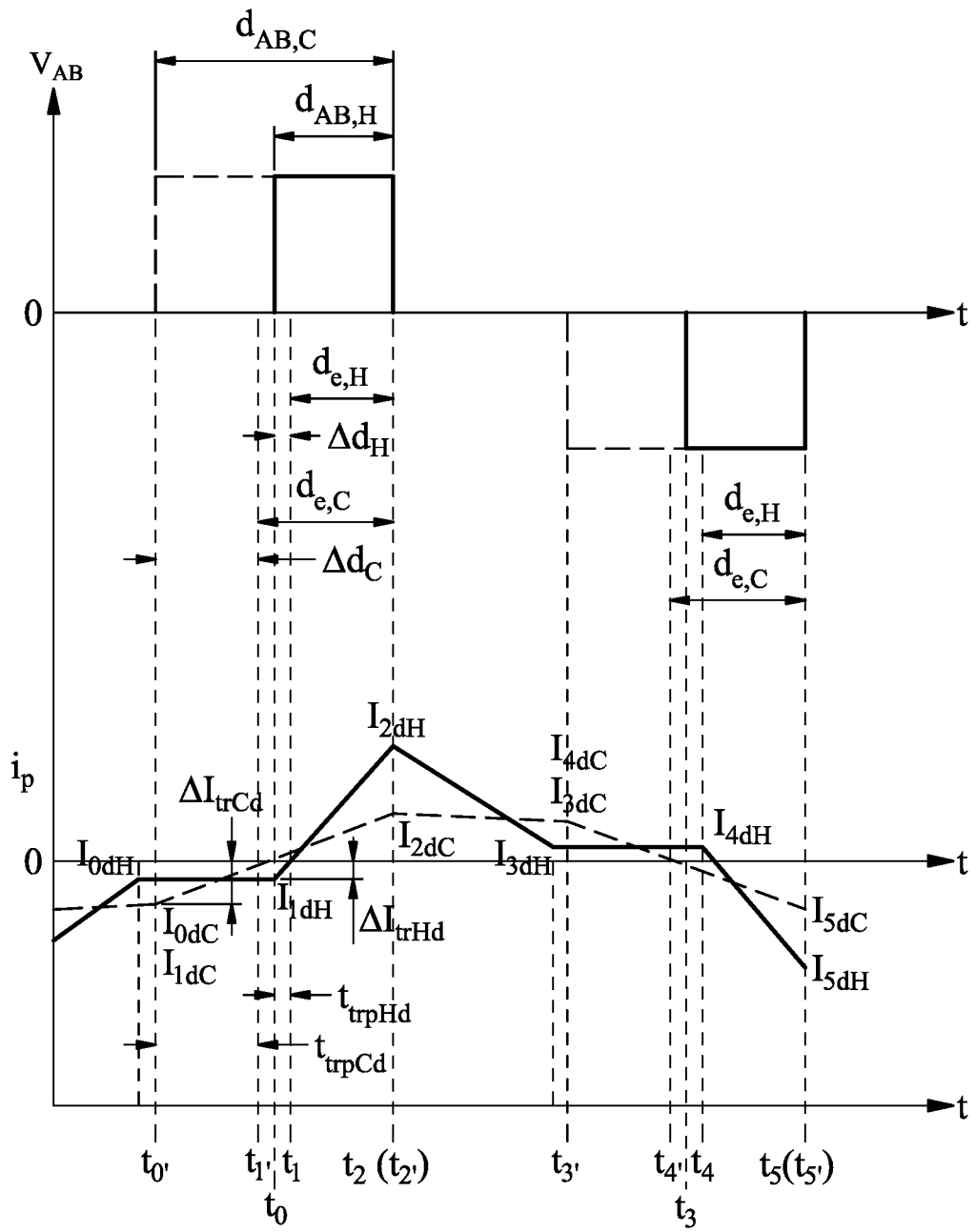

FIGS. 7(a)-(b) show the prediction and comparison for the behaviors of primary current in the PS-FB converter with HCMR and CDR filters, including waveforms for CCM and DCM, shown in FIGS. 7(a) and (b), respectively. All symbols in the upper and lower cases represent the CCM and DCM, respectively, where the subscripts of "H" and "C" refer to HCMR and CDR filters. For example, the terminal voltage $V_{AB}$ period caused by the HCMR (CDR) filter is indicated as $D_{AB,H}(D_{AB,C})$ in CCM and $d_{AB,H}$ ($d_{AB,C}$) in DCM. The transition period and the transition current variation of HCMR (CDR) are $t_{trpHC}$ ($t_{trpCC}$) and $\Delta I_{trHC}$ ($\Delta I_{trCC}$) for CCM, and $t_{trpHd}$ ($t_{trpCd}$) and $\Delta_{ItrHd}$ ($\Delta_{ItrCd}$) for DCM. FIG. 7(a) shows the primary currents concerning the period in CCM, in which $I_{nDH}$ and $I_{nDC}$, where n=0, 1, . . . 5, indicate the primary currents caused by the HCMR filter and the CDR filter, respectively. Regarding $V_{AB}$ duty $D_{AB,H}$ ($D_{AB,C}$), it is defined as the sum of transition duty and valid duty for HCMR (CDR) and described in FIG. 7(a), which is given by $$D_{AB,H} = \Delta D_H + D_{e,H} \quad (29)$$

for using the HCMR filter and $$D_{AB,C} = \Delta D_C + D_{e,C} \quad (30)$$

for using the CDR filter.

In the CCM mode in FIG. 7 (a), the valid duty cycle of HCMR prevailing in the $V_{AB}$ period $D_{e,H}/D_{AB,H}$ is greater than that of the CDR $D_{e,C}/D_{AB,C}$ and transition-duty ratio $\Delta dc/D_{AB,C} > \Delta D_H/D_{AB,H}$, indicating that the transition period $t_{trpHC}$ of HCMR is small than $t_{trpCC}$ of CDR. The result is more severe in DCM, i.e., $t_{trpHd} \ll t_{trpCd}$. Furthermore, the changes in transition current $\Delta I_{trHC}$ and $\Delta I_{trHD}$ are smaller than $\Delta I_{trCC}$ and $\Delta I_{trCd}$, respectively. Regarding the current transition level, the two levels $I_{0DC}$ and $I_{3DC}$ of CDR are significantly larger than the two levels of $I_{0DH}$ and $I_{3DH}$ of HCMR, respectively. The two levels cause the primary current of HCMR to have a slope slightly more extensive than that of CDR during the valid duty period and dead-zone period. Therefore, under the same power conditions, the power handling capability of the PS-FB converter with the HCMR filter is better than that with the CDR filter, due to $D_{e,H} > D_{e,C}$.

In FIG. 7(b), for the case of DCM, all transition periods are measured at about ground level because the measurement of the valid duty cycle is when the primary current starts from zero. In this case, $V_{AB}$ duty cycle is $d_{AB,C} > d_{AB,H}$, transition duty cycle $\Delta dc > \Delta dH$, and valid duty ratio $d_{e,C} > d_{e,H}$. As shown in FIG. 7(b), since the transition period $\Delta_{dc}$ is long, the value duty ratio $d_{e,C}$ of CDR is much smaller than $d_{AB,C}$. Viewed from a relative angle, the valid duty ratio $d_{e,C}/d_{AB,C}$ of CDR is much smaller than that of HCMR $d_{e,H}/d_{AB,H}$, due to $\Delta d_c/d_{AB,C} \gg \Delta d_H/d_{AB,H}$. Therefore, valid duty cycle $d_{e,H}$ is almost the same as $V_{AB}$ duty $d_{AB,H}$, due to the transition duty $\Delta dH \approx 0$, which also ensures that primary current can deliver with almost no transition loss during the $V_{AB}$ period. Besides, all HCMR transition levels $I_{0dH}$, $I_{1dH}$, $I_{3dH}$, and $I_{4dH}$ are at a low level, which will prompt the power switch pair to experience low current stress during the transition state. Primary current stress and output ripple is noteworthy since HCMR is a single-core inductor filter. Peak primary current is acceptable, compared to CDR, since current ripple can be removed easily by using a high-frequency metalized polypropylene film capacitor to ensure low output ripple current.

III. Design and Experiment

Design Considerations

To design an HCMR filter for symmetrical conversion, we made the two windings be identical, with turns ratio reaching $a_I = a_{II} = 1$, and $v_s(t)$ of $T_1$ amounts to at least three times the output voltage to generate 1.5 filter current, as evidenced by (9) and (20). The transition period can also be obtained graphically in FIG. 7(a), that is $$\Delta D = \frac{I_2 + I_3}{\frac{V_{dc}}{L_r} \cdot \frac{T}{2}} \quad (31)$$

The maximum terminal $V_{AB}$ duty $D_{max}$ should be $$D_{max} \geq \frac{V_o}{V_s} \quad (32)$$

The turns ratio n of the main transformer $T_1$ related to the valid duty $D_e$ is given by $$n = \frac{N_p}{N_s} = \frac{V_p}{V_s} \quad (33)$$
$$= \frac{V_{dc}}{V_s} \cdot D_e$$

where $$V_p = V_{dc} \cdot D_e \quad (34)$$

For the case of HCMR, if $V_s \geq 3V_o$, from (32), then, the $V_{AB}$ duty is $$D_{H,max} \geq \frac{1}{3} \quad (35)$$

Equation (35) is a design reference to achieve 1.5 times the filter current. However, the required $V_s$ is typically less than $2V_o$ for PS-FB converters with CDR filters and the $V_{AB}$ duty will be $$D_{C,max} \geq \frac{1}{2} \quad (36)$$

Equation (36) is suitable for a converter with a one-inductor filter.

B. Design Example and Experiment

In the present invention, a 1-kW PS-FB converter prototype was made to evaluate and compare the performances of the converter with HCMR filter and with CDR filter, with the configurations of FIGS. 1 and 2(a) being used as design references. The battery pack consists of four 12-V Kawasaki batteries. The PS-FB converter operates at 75 kHz, and an output current Io=20 A. For $L_1$ and $L_2$, the two estimated winding inductances of HCMR are 56 µH. For the CDR filter, the estimated inductance of each inductor filter is 51 pH, and an output current Io=20 A. The parameters of the transformer/main transformer $T_1$, the autotransformer $T_2$ and the CDR filter are measured when they are operated under a frequency of 75 kHz, and include primary leakage inductance $I_{kp}$=3.60 µH, primary inductance $L_p$=2.25 mH, magnetizing inductance $L_m$=2.25 mH, secondary leakage inductance $L_{lks}$=0.96 µH, and secondary inductance $L_s$=0.57 mH. The first and the second windings of $T_2$ are $L_1$=56.18 µH and $L_2$=55.45 µH, respectively. The PS-FB having the CDR filter has $L_1$=51.5 µH and $L_2$=51.56 µH.

Figure 8:
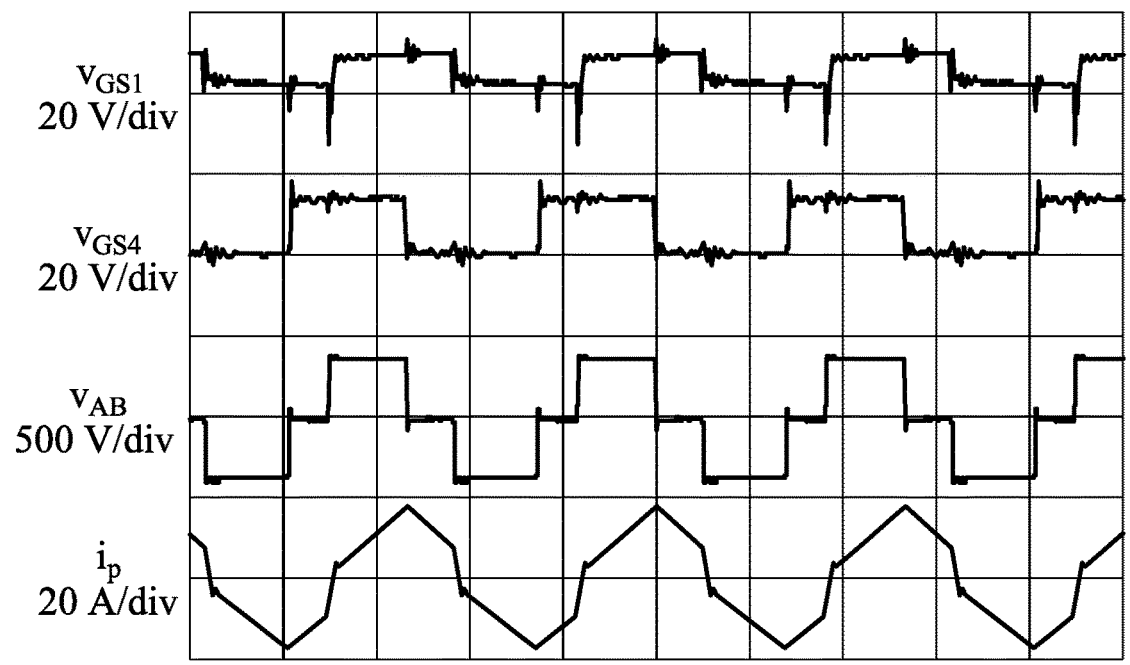
FIG. 8(a) displays waveforms $V_{GS1}$, $V_{GS4}$, $V_{AB}$ and $i_p(=i_{Lr})$ of the primary side of the main transformer $T_1$ in CCM of the PS-FB converter as shown in FIG. 2(a).
FIG. 8(b) displays waveforms $v_s$, $i_1$, $i_2$ and $i_o$ of the secondary side of the main transformer $T_1$ in CCM of the PS-FB converter as shown in FIG. 2(a).
Figure 8:
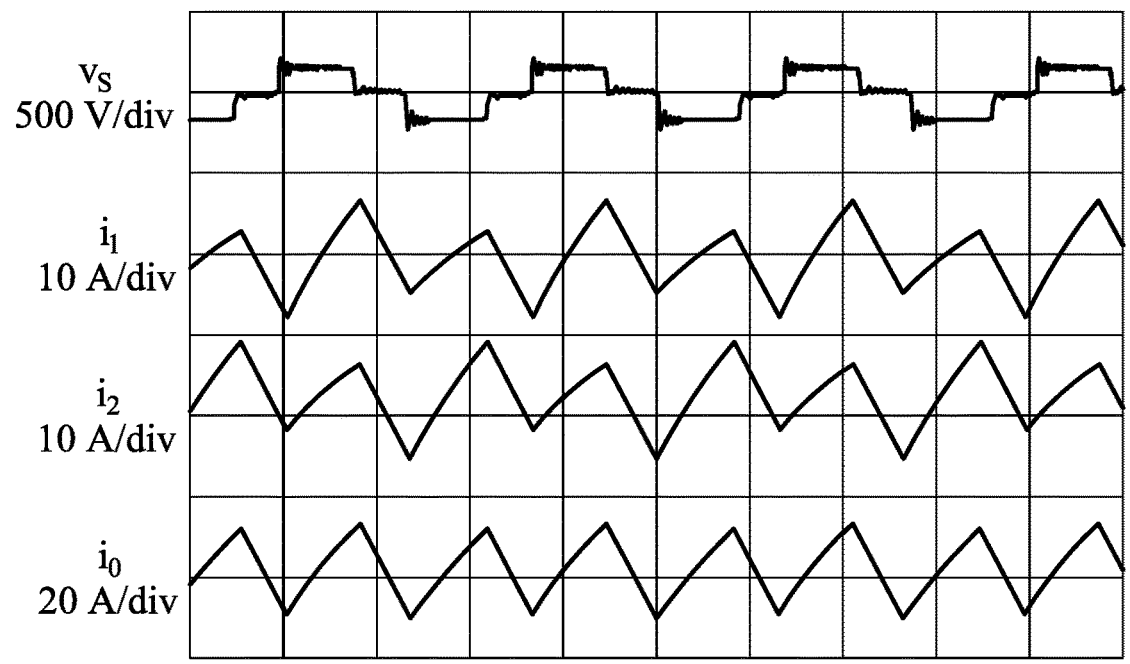

FIG. 8(a) shows waveforms $V_{GS1}$, $V_{GS4}$, $V_{AB}$ and $i_p$ (=$i_{Lr}$) of the primary side of the main transformer $T_1$ in CCM of the PS-FB converter as shown in FIG. 2(a). In FIG. 8(a), primary current $i_p$ delivery seems to take place almost entirely during the $V_{AB}$ period, since the transition period is minimal, in which the transition current ranges from −3.5 to +2 A. In the dead-zone period, primary current droops to the level of +3.5 A. FIG. 8(b) shows waveforms $v_s$, $i_1$, $i_2$ and $i_o$ of the secondary side of the main transformer $T_1$ in CCM of the PS-FB converter as shown in FIG. 2(a). FIG. 8(b) shows that during the valid duty period, the slope of series current $i_1$ in $T_2$ is twice that of the induced common current $i_2$. The sum of the two currents generates an output current 1.5 times the current $i_1$. During the dead-zone period, both $i_1$ and $i_2$ descend at the same slope, causing $i_o$ to fall sharply, which induces the primary current $i_p$ to drop rapidly to a low level, serving as the transition current for the next conversion phase. For the subsequent conversion phase-II, with $V_{AB}$<0, the waveforms and phenomena displayed are opposite to those in the conversion phase-I.

Figure 9:
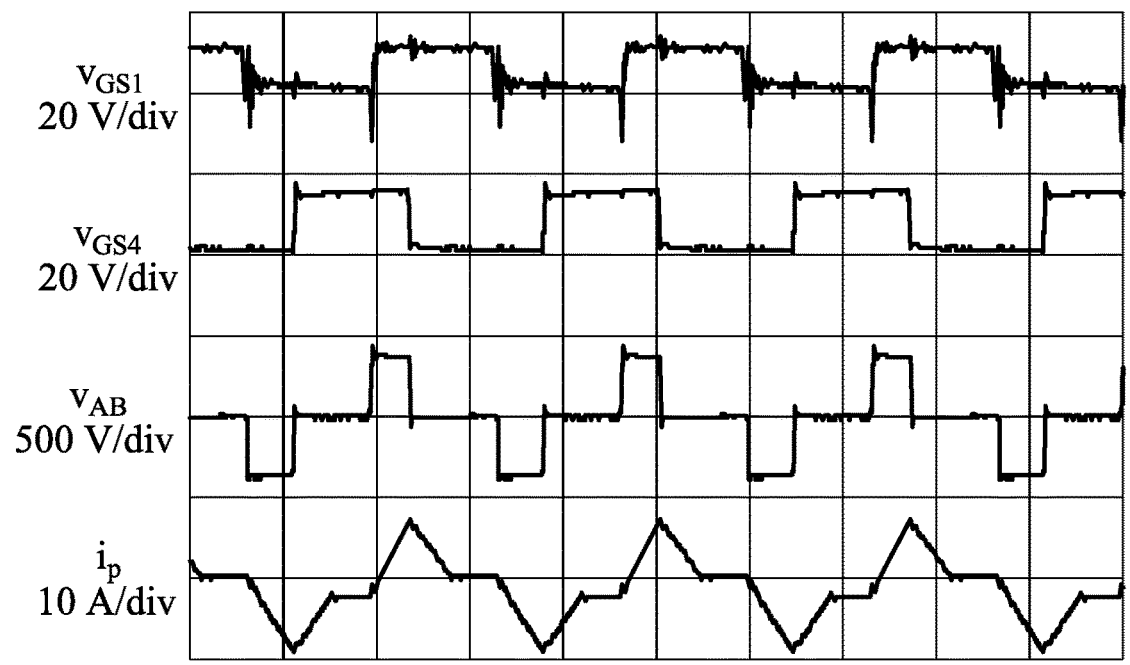
FIG. 9(a) displays waveforms $V_{GS1}$, $V_{GS4}$, $V_{AB}$ and $i_p(=i_{Lr})$ of the primary side of the main transformer $T_1$ in DCM of the PS-FB converter as shown in FIG. 2(a).
FIG. 9(b) displays waveforms $v_s$, $i_1$, $i_2$ and $i_o$ of the primary side of the secondary side of the main transformer $T_1$ in DCM of the PS-FB converter as shown in FIG. 2(a).
Figure 9:
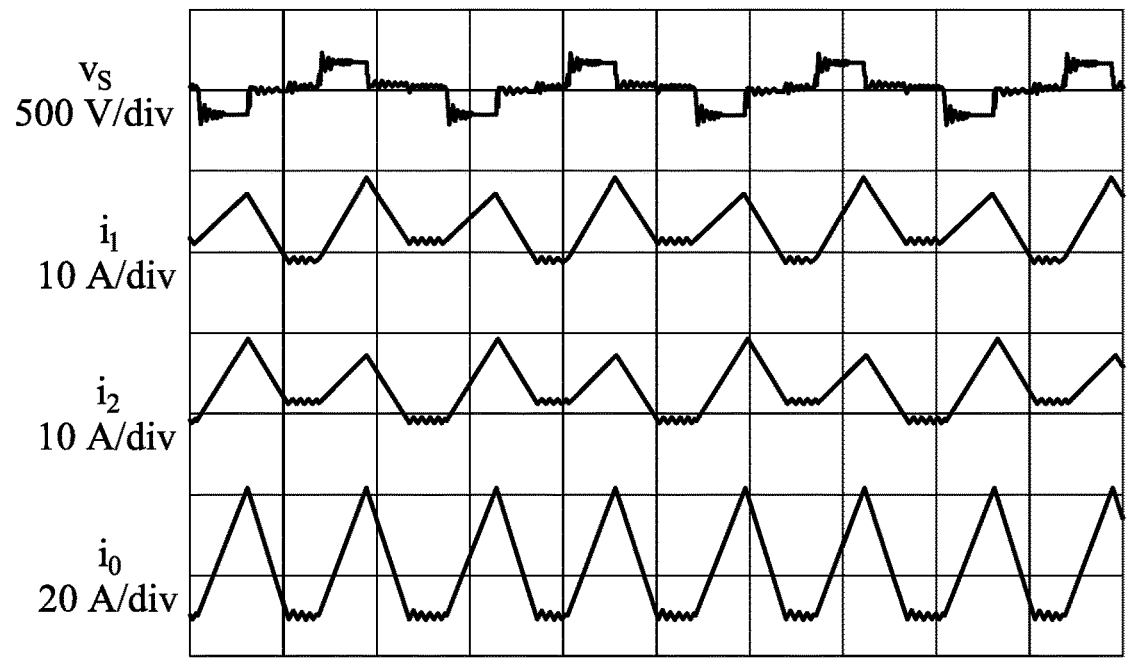

FIG. 9(a) shows waveforms $V_{GS1}$, $V_{GS4}$, $V_{AB}$ and $i_p$(=$i_{Lr}$) of the primary side of the main transformer $T_1$ in DCM of the PS-FB converter as shown in FIG. 2(a). FIG. 9(a) shows the relationship between the gate signal of the switch pair ($Q_1$ and $Q_4$) and the period of terminal voltage $V_{AB}$. During the phase-I conversion, with $V_{AB}$>0, primary current $i_p$ rises first from the negative shallow current of −2 A and supplies power almost throughout the $V_{AB}$ period, and the transition time is small enough to be negligible. FIG. 9(b) shows waveforms $v_s$, $i_1$, $i_2$ and $i_o$ of the primary side of the secondary side of the main transformer $T_1$ in DCM of the PS-FB converter as shown in FIG. 2(a). On the secondary side of $T_1$, as shown in FIG. 9(b), during valid duty, the slope of series current $i_1$ in $T_2$ is still twice that of induced common current $i_2$, with the sum causing primary current $i_p$ to rise at a steep slope. During the dead-zone period, they still have the same slope and their slope sum effectively droops primary current quickly to a shallow current in the middle of the dead time. Similar to conversion phase-II, with $V_{AB}$<0, the waveforms and phenomena in the DCM are opposite to those in the phase-I conversion.

Figure 10:
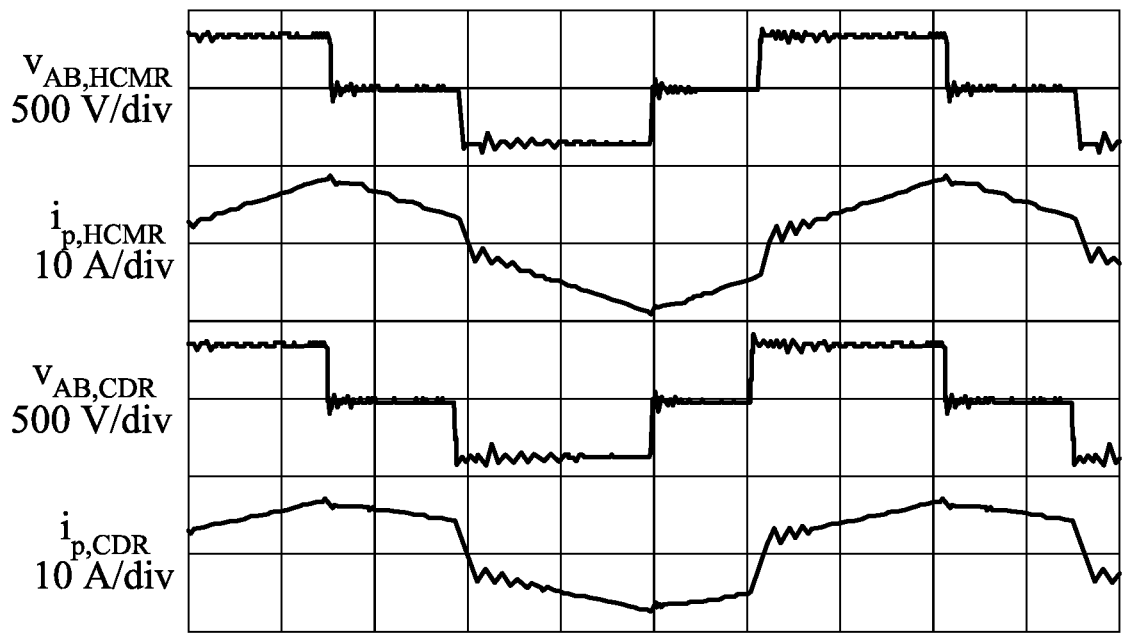
FIG. 10(a) displays waveforms of primary currents in CCM of the PS-FB converters with HCMR filter and CDR filter respectively.
FIG. 10(b) displays waveforms of primary currents in DCM of the PS-FB converters with HCMR filter and CDR filter respectively.
Figure 10:
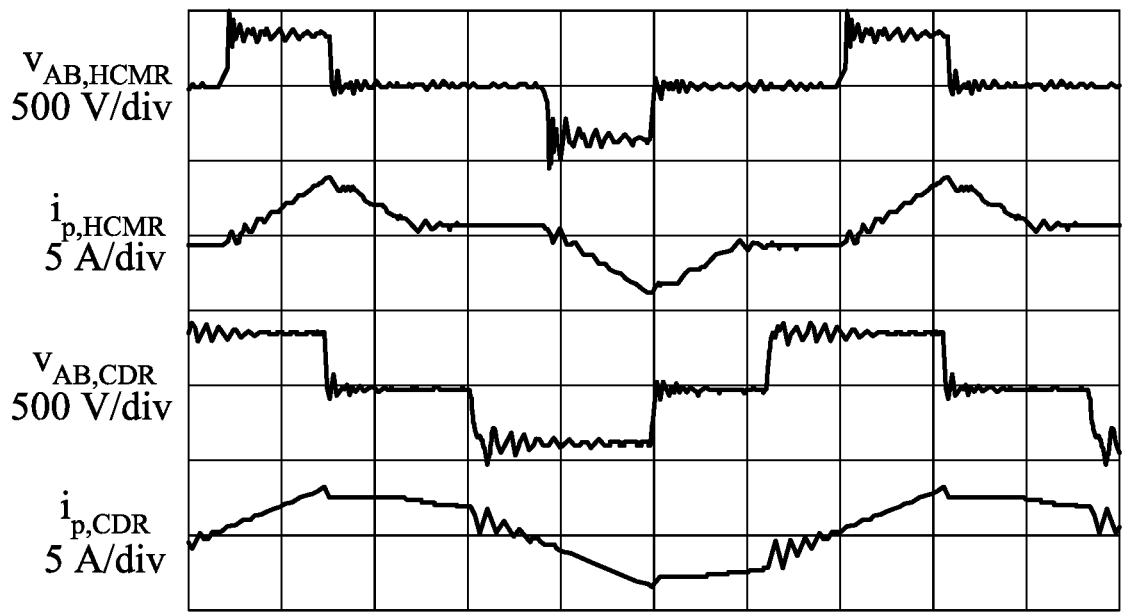

FIG. 10(a) shows waveforms of primary currents in CCM of the PS-FB converter with HCMR filter and CDR filter respectively. FIG. 10(b) shows waveforms of primary currents in DCM of the PS-FB converter with HCMR filter and CDR filter respectively. The primary currents of CCM and DCM measure $P_o$=1 Kw and $P_o$=200 W, respectively, as shown in FIGS. 10(a) and 10(b). The subscripts "H" and "C" on measurement parameters indicate the waveforms with HCMR and CDR, respectively. FIG. 10(a) shows the primary currents in CCM, in which waveforms $i_{p,H}$ and $i_{p,C}$ seem to be quite similar under the heavy load condition. A significant difference is that in valid duty, the slope of $i_{p,H}$ is slightly higher than $i_{p,C}$, but transition current $i_{p,H}$ is less than $i_{p,C}$, as a result of which $V_{AB,H}$ duty is a little smaller than $V_{AB,C}$ duty.

In the dead-zone period, the falling slope of $i_{p,H}$ is larger than $i_{p,C}$, the reason why the low transition current is obtained at the end of dead-zone period. FIG. 10(b) shows the case of $P_o$=200 W in the DCM mode. Terminal voltage $V_{AB,H}$ duty is much smaller than $V_{AB,C}$ duty. The transition period during $V_{AB,C}$ is very long, which reads based on the ground reference. In the phase-I conversion, with $V_{AB,C}$>0, the time interval can be found from the start of $V_{AB,C}$ or the time when $i_{p,C}$ rises from shallow negative current to reference ground, i.e., the transition time. The remaining space in $V_{AB,C}$ is a valid period. As for $V_{AB,H}$ duty, since the negative shallow current portion of the transition period is tiny, valid duty is almost equivalent to $V_{AB,H}$ duty. During the dead-zone period, $i_{p,C}$ is always clamped at a high level until the end period, resulting in a high transition current level and thereby increasing transition loss in the next phase conversion. In the case of HCMR, $i_{p,H}$ drops quickly to low positive transition current in the middle of the dead-zone period, which helps the switch to conduct near ZVS and to withstand shallow current stress in the next phase transition, as previously described.

The measurement parameters of the duty cycle for using HCMR and CDR filters are listed in Tables I and II for comparison. As indicated in Table I, in the CCM, the valid period prevalent in the terminal $V_{AB,H}$ period is $D_{e,H}/D_{AB,H}$=91.43%, slightly larger than $D_{e,C}/D_{AB,C}$=88.63% in the $V_{AB,C}$ period. The transition period and transition current of HCMR are $t_{trpHC}$=12.06 ns and $\Delta I_{trHC}$=5 A, smaller than $t_{trpCC}$=16.7 ns and $\Delta I_{trCC}$=7 A in CDR. However, in the DCM, $d_{e,H}/d_{AB,H}$=91.3% is much larger than $d_{e,C}/d_{AB,C}$=64.28%. The transition period and transition current of HCMR are $t_{trpHC}$=12.06 ns and $\Delta I_{trHC}$=5 A, far smaller than $t_{trpCd}$=50.25 ns and $\Delta I_{trCd}$=2.5 A of CDR. Obviously, whether in CCM or DCM, HCMR does help reduce the transition time and make valid period, $D_{e,H}$ and de,H, close to 92% of terminal $V_{AB,H}$ period, effectively improving the power handling capability and conversion performance of the PS-FB converter.

TABLE 1 comparison of measured duty cycle parameters with
heavy load in CCM
PS-FB converter @1 kW, (heavy load in CCM) comparison with
the half-switching period ($T_s$/2 = 67 ns)

| HCMR filter | | CDR filter | |
|---|---|---|---|
| $D_{AB,H}/(T_s/2)$ | 60.43% | $D_{AB,C}/(T_s/2)$ | 63.30% |
| $D_{e,H}/(T_s/2)$ | 55.25% | $D_{e,C}/(T_s/2)$ | 55.25% |
| $\Delta D_H/D_{AB,H}$ | 8.57% | $\Delta D_C/D_{AB,C}$ | 11.36% |
| $D_{e,H}/D_{AB,H}$ | 91.43% | $D_{e,C}/D_{AB,C}$ | 88.63% |
| $t_{trpHC}$ | 12.06 ns | $t_{trpCC}$ | 16.7 ns |
| $\Delta I_{trHC}$ | 5 A | $\Delta I_{trCC}$ | 7 A |

TABLE 2 comparison of measured duty cycle parameters with
light load in DCM
PS-FB converter @200 W, (light load in DCM) comparison with
the half-switching period ($T_s$/2 = 67 ns)

| HCMR filter | | CDR filter | |
|---|---|---|---|
| $d_{AB,H}/(T_s/2)$ | 31.94% | $d_{AB,C}/(T_s/2)$ | 58.33% |
| $d_{e,H}/(T_s/2)$ | 29.17% | $d_{e,C}/(T_s/2)$ | 37.50% |
| $\Delta d_H/d_{AB,H}$ | 8.7% | $\Delta d_C/d_{AB,C}$ | 35.72% |
| $d_{e,H}/d_{AB,H}$ | 91.3% | $d_{e,C}/d_{AB,C}$ | 64.28% |
| $t_{trpHd}$ | 6.7 ns | $t_{trpCd}$ | 50.25 ns |
| $\Delta I_{trHd}$ | 0.5 A | $\Delta I_{trCd}$ | 2.5 A |

Figure 11:
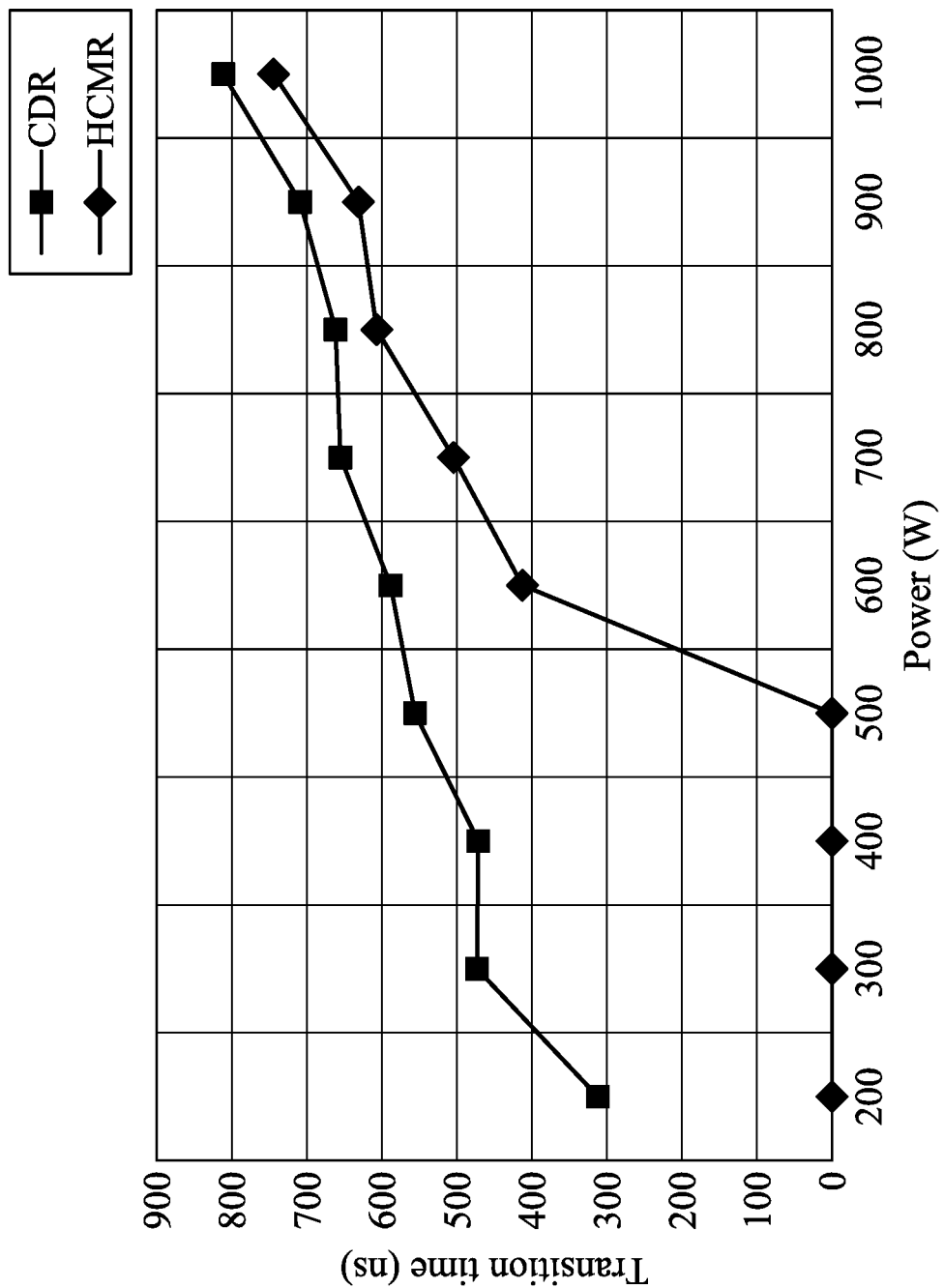
FIG. 11 displays waveforms showing the relationship between the transition time and the output power of the PS-FB converter with HCMR and CDR filters, respectively.

FIG. 11 displays waveforms showing the relationship between the transition time and the output power of the PS-FB converter with HCMR and CDR filters, respectively. In the DCM, the output power is less than 500 W, the transition time with the HCMR filter is almost zero, and the transition time with the CDR filter is 300-550 ns. As for CCM and power above 500 W, the transition time for the use of HCMR filter increases as power increases. For the CDR filter, the transition time is 550-820 ns higher than that of HCMR. When power increases to 800 W-1 kW, there appears a gap of transition time of about 80-90 ns between HCMR and CDR, but the transition time of HCMR is always smaller than that of CDR. Basically, no matter which filter is used, the transition time generated is not linear. In the present invention, in the HCMR curve, the increased slopes of 600-800 W and 900-1 kW are similar, while the transition time slope between 800 and 900 W is slower. The main reason is the effect caused by the parasitic and stray components in this power control band.

Figure 12:
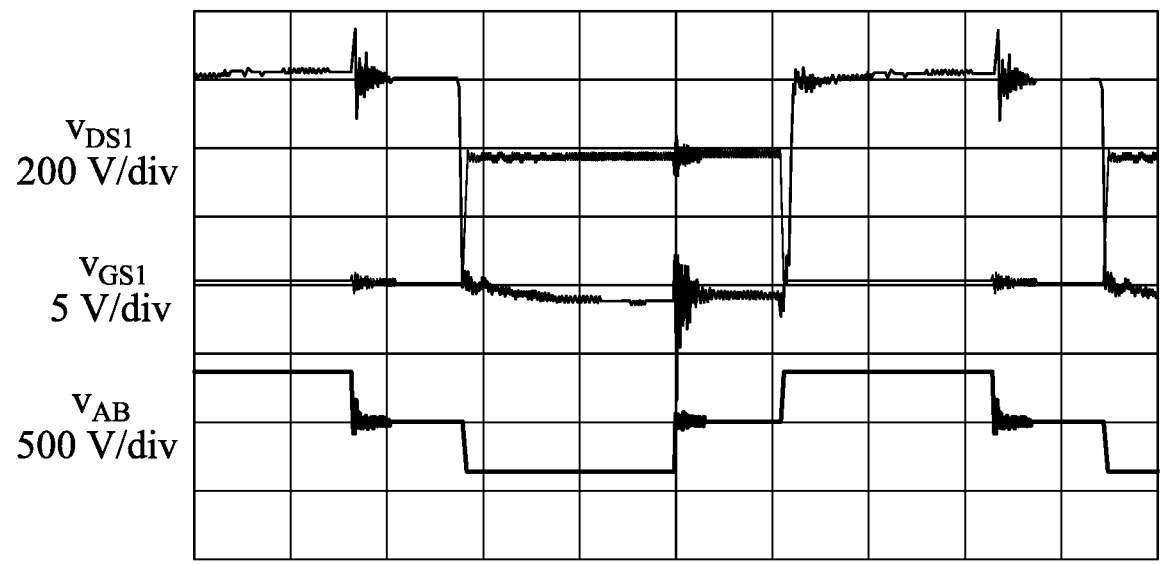
FIG. 12(a) displays waveforms showing the switching behavior of $v_{DS1}$, $v_{GS1}$ and $v_{AB}$ of the leading-leg $Q_1$ measured in CCM at Po=1 kW of the PS-FB converter as shown in FIG. 2(a).
FIG. 12(b) displays waveforms showing the switching behavior of $v_{DS1}$, $v_{GS1}$ and $v_{AB}$ of the leading-leg $Q_1$ measured in DCM at Po=200 W of the PS-FB converter as shown in FIG. 2(a).
Figure 12:
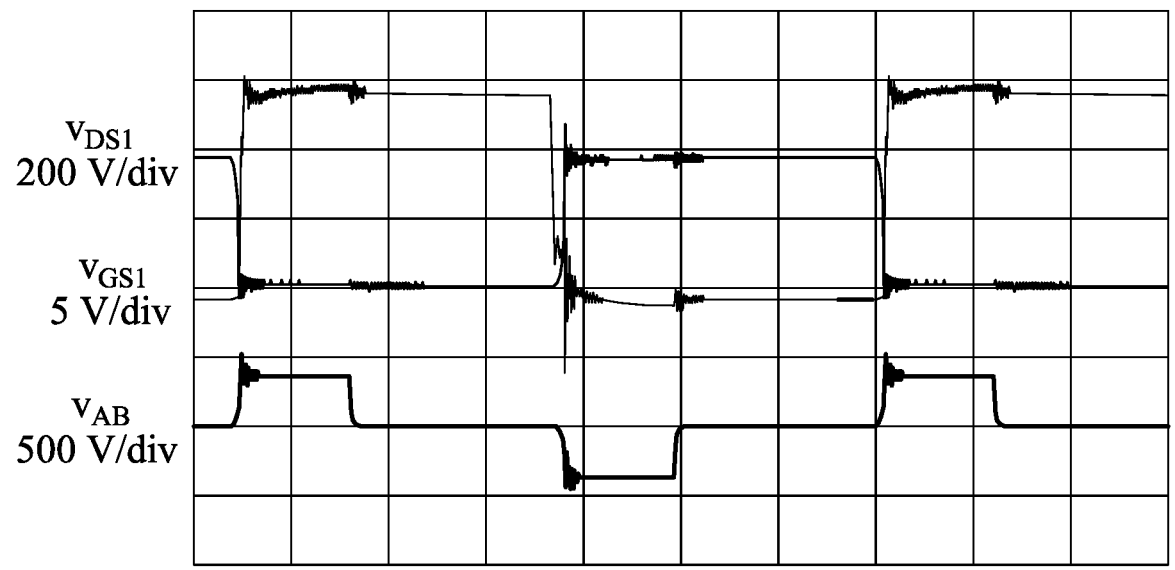

FIG. 12(a) displays waveforms showing the switching behavior of $v_{DS1}$, $v_{GS1}$ and $v_{AB}$ of the leading-leg $Q_1$ measured in CCM at $P_o$=1 kW of the PS-FB converter as shown in FIG. 2(a). FIG. 12(b) displays waveforms showing the switching behavior of $v_{DS1}$, $v_{GS1}$ and $v_{AB}$ of the leading-leg $Q_1$ measured in DCM at $P_o$=200 W of the PS-FB converter as shown in FIG. 2(a). FIGS. 12(a) and (b) show the leading-leg $Q_1$ (power switches $Q_1$ and $Q_2$ are configured on the leading-leg) in the CCM and DCM, respectively. $Q_1$ of Leading-leg can perform ZVS throughout CCM and DCM. Even in the turnoff state, there is only a very low switching loss. A small amount of ringing noise comes from the gate of MOSFET, due to the noise induced by the test probe.

Figure 13:
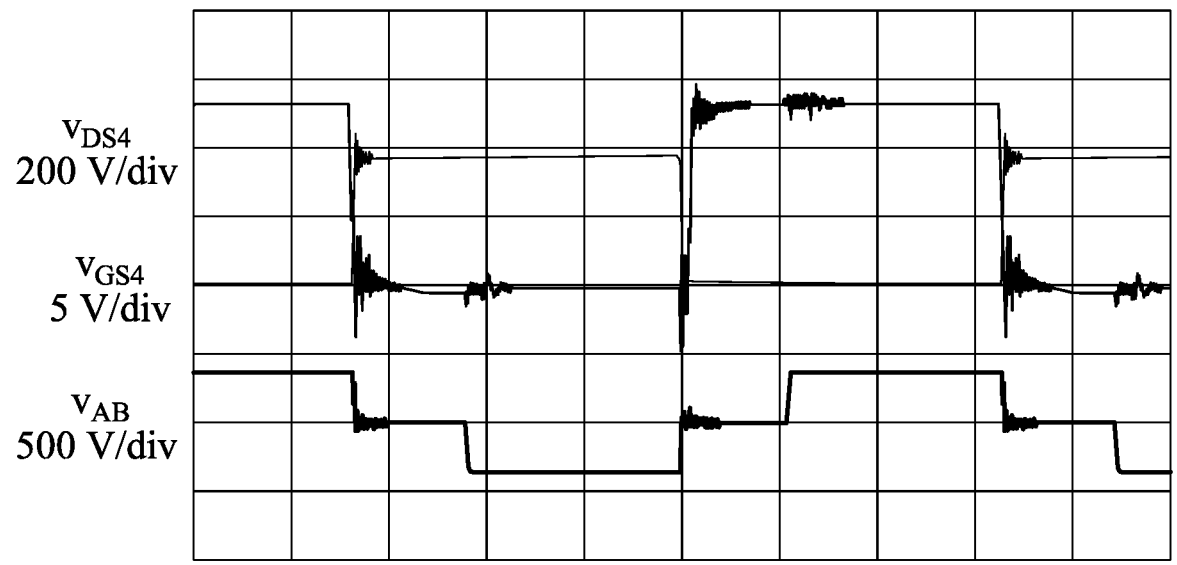
FIG. 13(a) displays waveforms showing the switching behavior of $v_{DS4}$, $v_{GS4}$ and $v_{AB}$ of the lagging-leg $Q_4$ measured in CCM at Po=1 kW of the PS-FB converter as shown in FIG. 2(a).
FIG. 13(b) displays waveforms showing the switching behavior of $v_{DS4}$, $v_{GS4}$ and $v_{AB}$ of the lagging-leg $Q_4$ measured in DCM at Po=200 W of the PS-FB converter as shown in FIG. 2(a).
Figure 13:
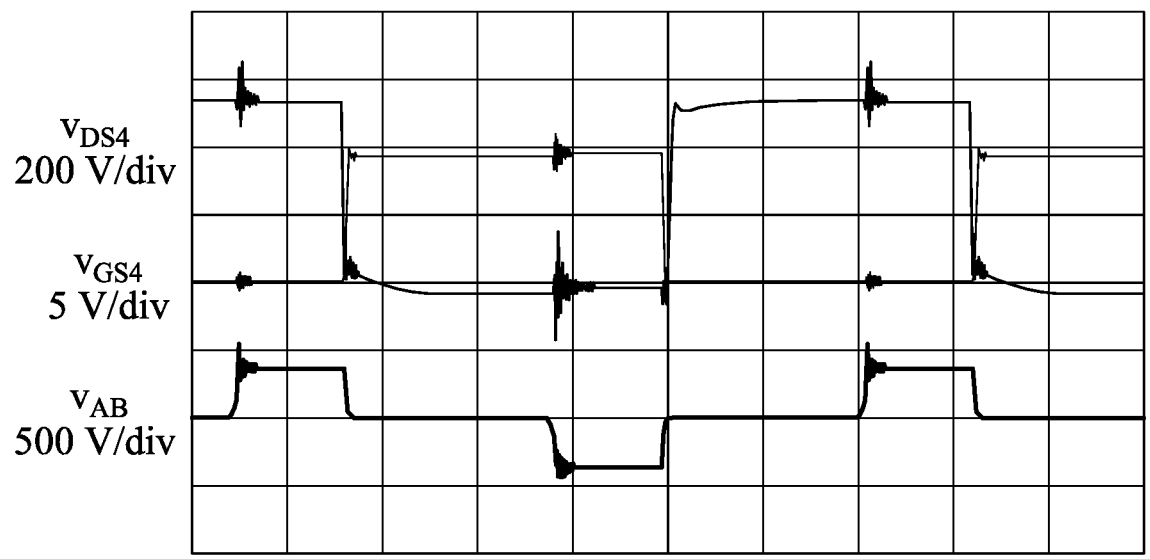

FIG. 13(a) displays waveforms showing the switching behavior of $v_{DS4}$, $v_{GS4}$ and $v_{AB}$ of the lagging-leg $Q_4$ measured in CCM at $P_o$=1 kW of the PS-FB converter as shown in FIG. 2(a). FIG. 13(b) displays waveforms showing the switching behavior of $v_{DS4}$, $v_{GS4}$ and $v_{AB}$ of the lagging-leg $Q_4$ measured in DCM at $P_o$=200 W of the PS-FB converter as shown in FIG. 2(a). For lagging-leg $Q_4$ (power switches $Q_3$ and $Q_4$ are configured on the lagging-leg), FIGS. 13(a) and (b) also shows good ZVS for CCM and DCM, and the turn-off state still shows low switching loss. Furthermore, as mentioned earlier, there is still some ringing noise from the test probe.

Figure 14:
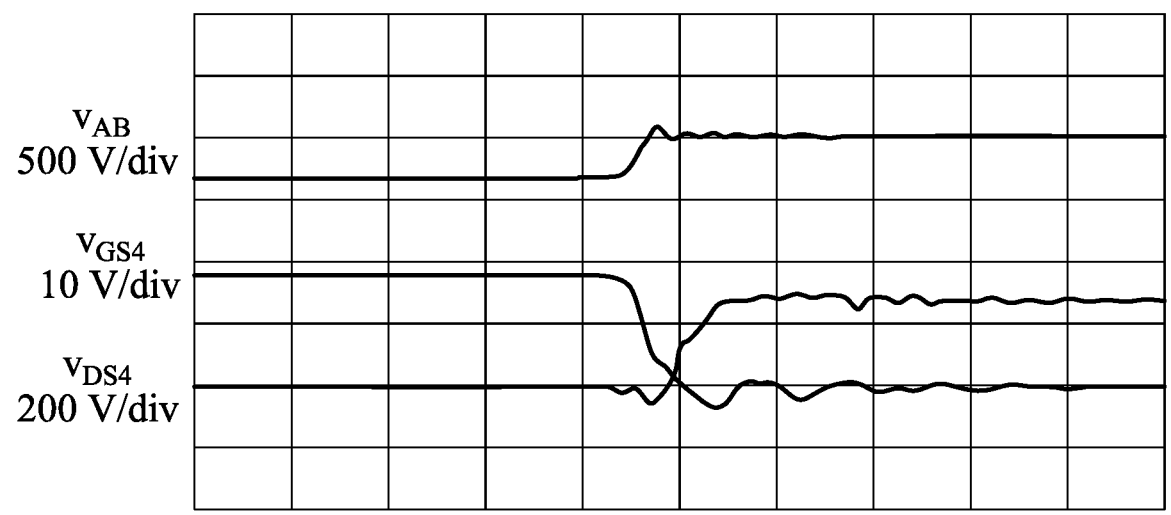
FIG. 14(a) displays waveforms highlighting the switching behavior of $v_{DS4}$, $v_{GS4}$ and $v_{AB}$ of the lagging-leg $Q_4$ measured in CCM at Po=1 kW of the PS-FB converter as shown in FIG. 2(a).
FIG. 14(b) displays waveforms highlighting the switching behavior of $v_{DS4}$, $v_{GS4}$ and $v_{AB}$ of the lagging-leg $Q_4$ measured in DCM at Po=200 W of the PS-FB converter as shown in FIG. 2(a).
Figure 14:
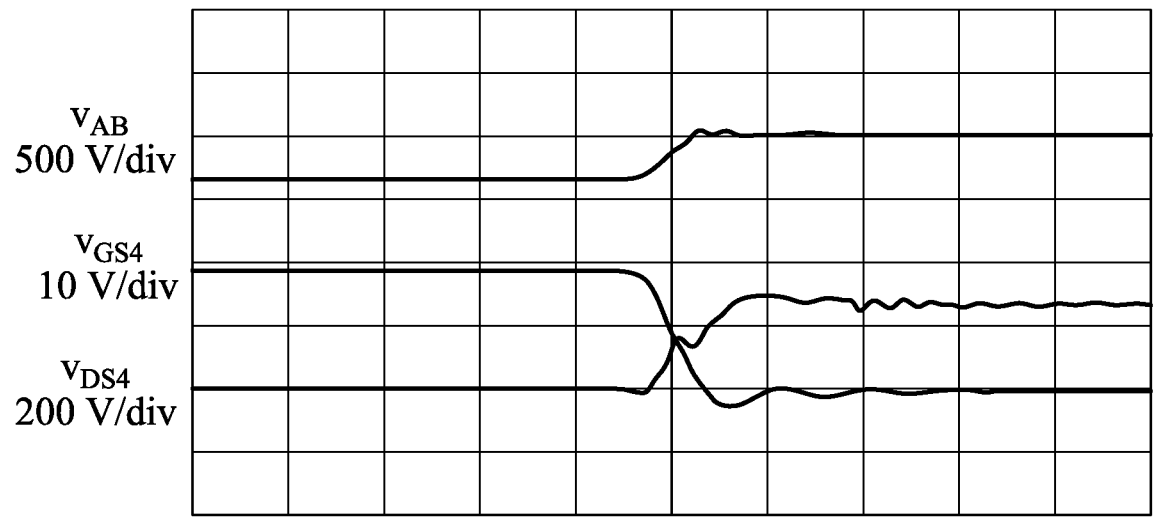

FIG. 14(a) displays waveforms highlighting the switching behavior of $v_{DS4}$, $v_{GS4}$ and $v_{AB}$ of the lagging-leg $Q_4$ measured in CCM at $P_o$=1 kW of the PS-FB converter as shown in FIG. 2(a). FIG. 14(b) displays waveforms highlighting the switching behavior of $v_{DS4}$, $v_{GS4}$ and $v_{AB}$ of the lagging-leg $Q_4$ measured in DCM at $P_o$=200 W of the PS-FB converter as shown in FIG. 2(a). In order to clarify the switching behavior of lagging-leg $Q_4$ in the CCM and DCM, their switching phenomena are highlighted in FIGS. 14(a) and (b). FIG. 14(a) shows that $Q_4$ in CCM can perform ZVS correctly, but FIG. 14(b) shows that in DCM, $Q_4$ can switch at near ZVS with only little switching loss. However, for the PS-FB converter with the CDR filter, it is difficult for lagging-leg $Q_4$ in DCM to obtain ZVS.

Figure 15:
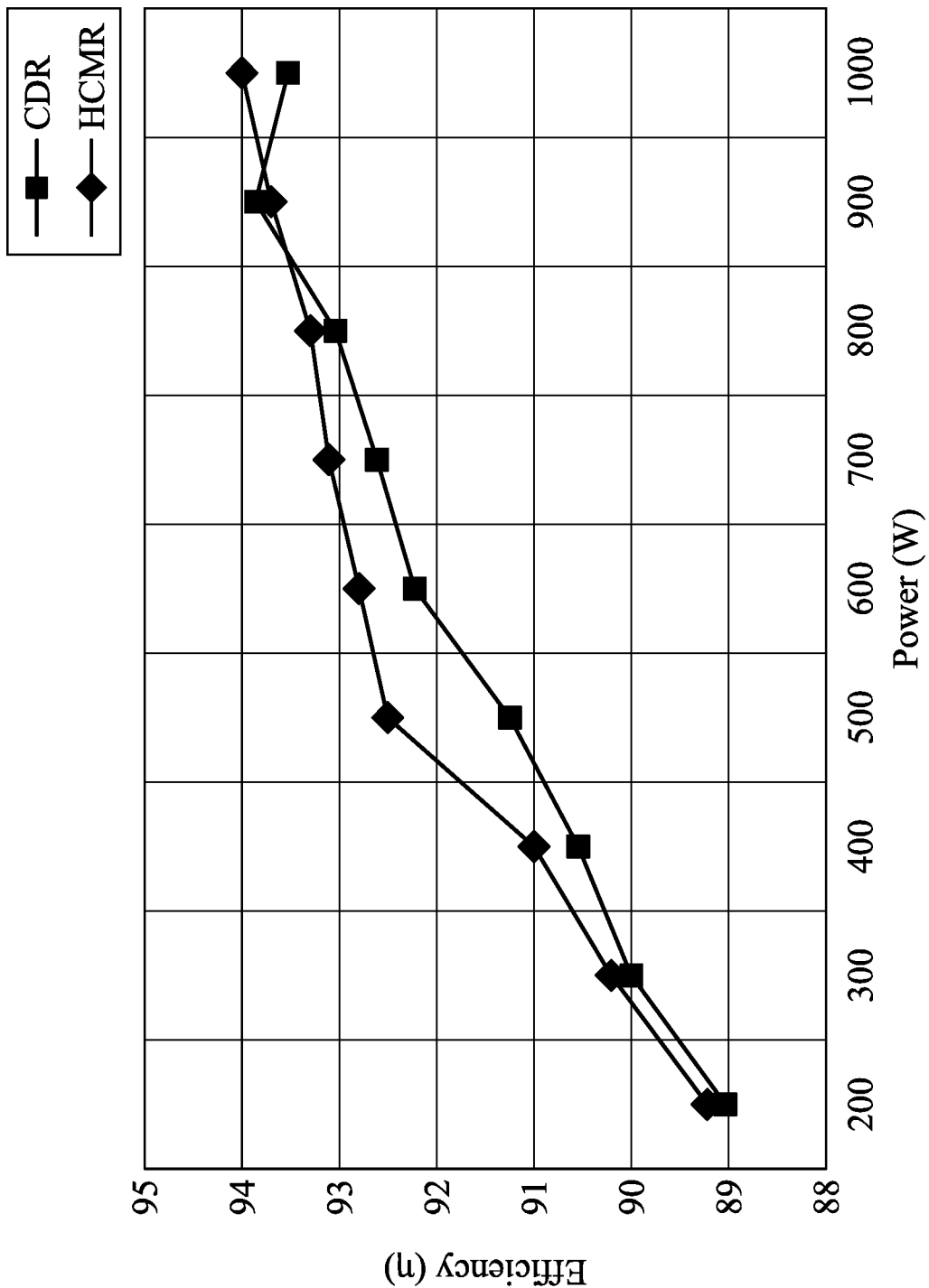
FIG. 15(a) displays waveforms showing efficiencies comparison of the PS-FB converters with HCMR and CDR filters as shown in FIG. 2(a) and FIG. 1.
FIG. 15(b) displays waveforms showing component temperatures of the PS-FB converters with HCMR filter as shown in FIG. 2(a).
FIG. 15(c) displays waveforms showing component temperatures of the PS-FB converters with CDR filter as shown in FIG. 1.
Figure 15:
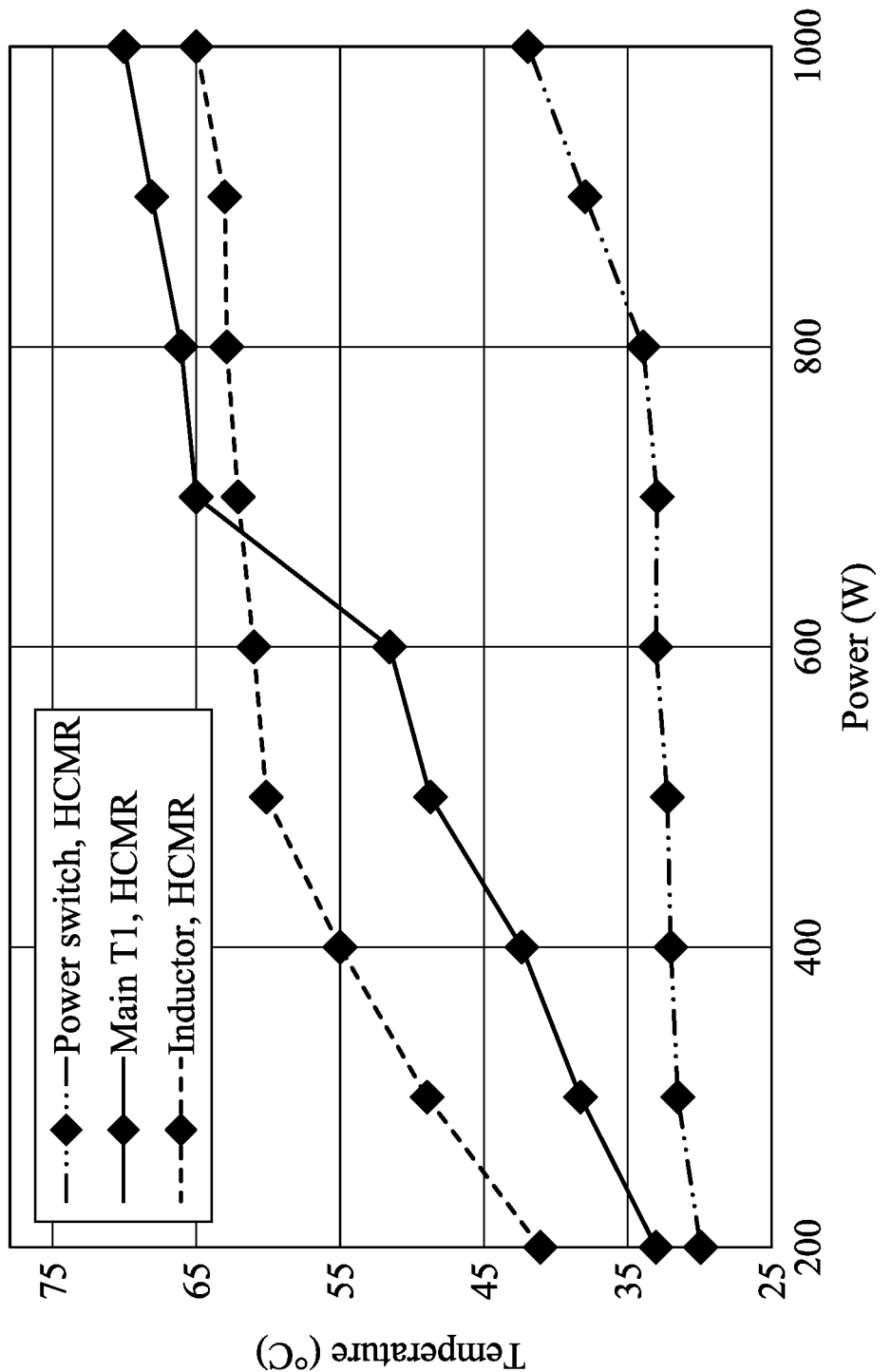
Figure 15:
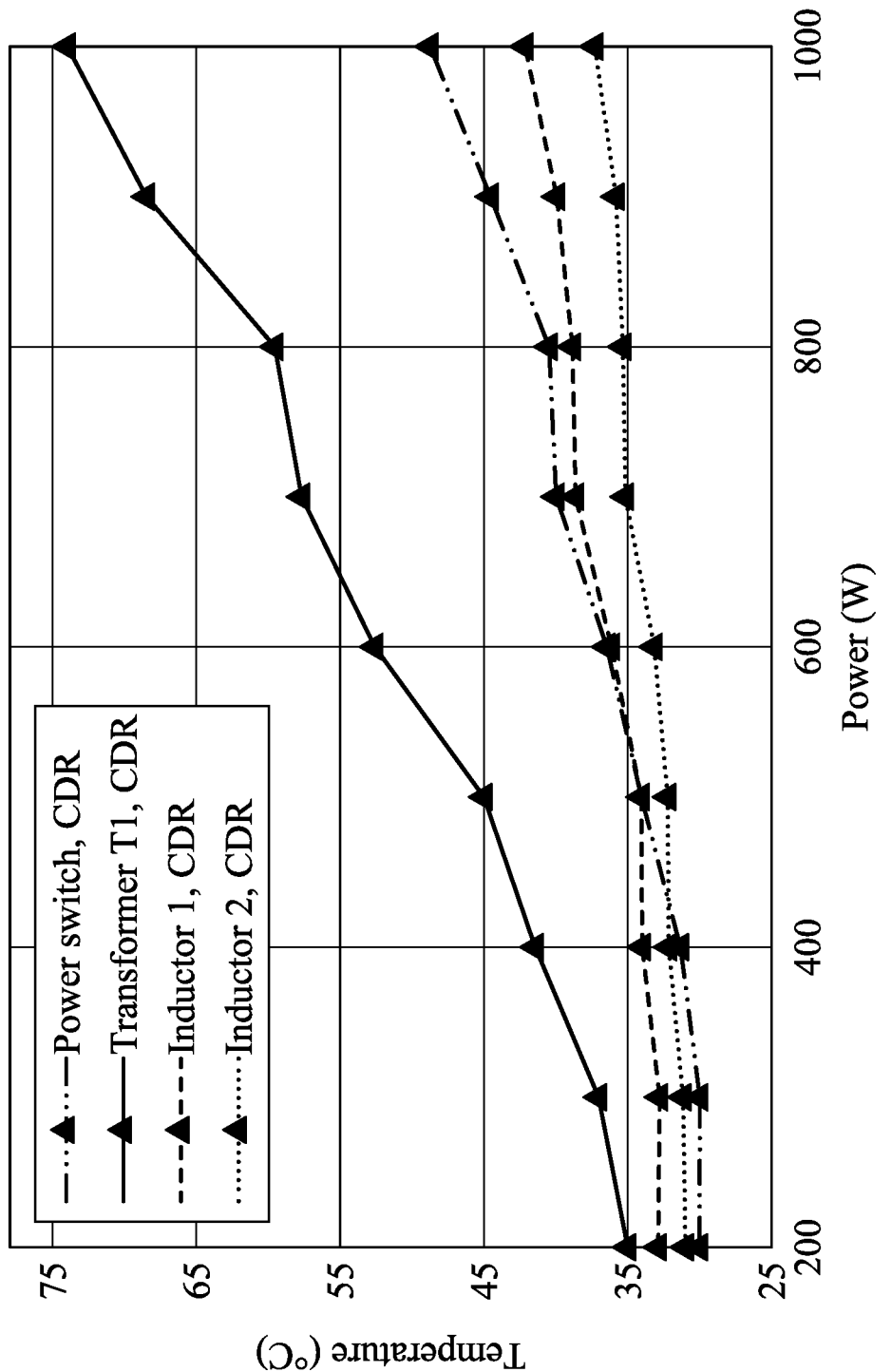

FIG. 15(a) displays waveforms showing efficiencies comparison of the PS-FB converters with HCMR and CDR filters as shown in FIG. 2(a) and FIG. 1. FIG. 15(b) displays waveforms showing component temperatures of the PS-FB converters with HCMR filter as shown in FIG. 2(a). FIG. 15(c) displays waveforms showing component temperatures of the PS-FB converters with CDR filter as shown in FIG. 1. FIGS. 15(a)-(c) show the comparison of efficient distribution and temperature versus power output of PS-FB converter with HCMR and CDR filters. FIG. 15(a) shows the efficiency distribution between the use of HCMR and CDR, underscoring slightly higher efficiency of HCMR than CDR in intermediate load range but rather equal efficiency at the two load ends. The power efficiency of HCMR stands at 91%-94% in the range of 300 W and 1 kW, which drops to 89%-90% in the range of 200 and 300 W. The efficiency gap between the HCMR and CDR filters reaches 0.5%-1.0%. The temperatures of the main transformer T1, power switch, and inductor filters are shown in FIGS. 15(b) and (c). The component temperatures for HCMR and CDR are represented by diamonds and triangles, with respective labels of "HCMR" and "CDR." The dotted line related to $T_1$ indicates the main transformer temperature, such as $T_{1,H}$ and $T_{1,C}$, which are close in general, but at 1 kW, $T_{1,H}$=70° C. is lower than $T_{1,C}$=75° C. The dotted line related to power switch represents the power switch temperature, in which $T_{pw,H}$=31° C. and $T_{pw,C}$=41° C. at 800 W and $T_{pw,H}$=42° C. and $T_{pw,C}$=48° C. at 1 kW. In other words, in the case of HCMR, power switching loss appears to be low.

In FIGS. 15(b) and 15(c), the dotted line(s) related to inductor(s) indicates the temperature of filter inductor. FIGS. 15(b) and (c) show that for 500 W-1 Kw of power, inductor temperature TL,H reaches 60° C.-65° C. Although the higher temperature TL,C of a single inductor of the CDR is only 34° C.-42° C., the total temperature range of two separate single inductors is 66° C.-79° C., which seems to be slightly higher than the temperature of HCMR. Also, as indicated in the data sheet of the Micrometals alloy powder core, the inductance temperature at 60° C. changes the inductance value by about 2% only, so the HCMR inductance temperature measured in the present invention is acceptable.

Figure 16:
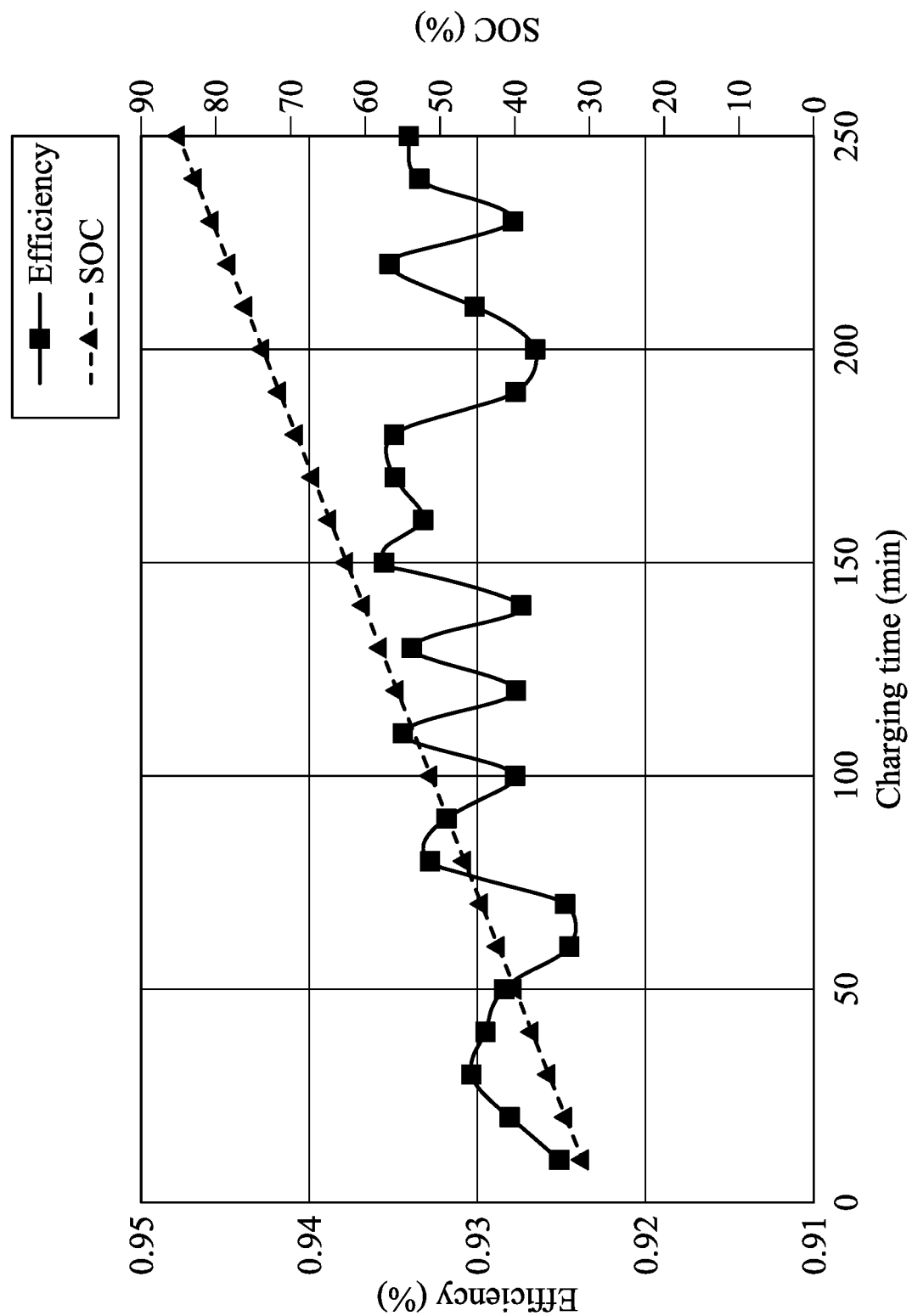
FIG. 16 displays waveforms of charging curve of the PS-FB converter with HCMR filter as shown in FIG. 2(a) at charging current Io=20 A.

FIG. 16 displays waveforms of charging curve of the PS-FB converter with HCMR filter as shown in FIG. 2(a) at charging current Io=20 A. The charging behavior of the PS-FB converter with HCMR is shown in FIG. 16, which shows that the charging current of the 48-V battery pack is set at a constant level of 20 A. Charging with the battery begins at 35% state of charge (SOC). The PS-FB converter takes 250 min to complete charging, raising SOC from 35% to 85%. Conversion efficiency remains between 92.5% and 93.5% during the charging process. Efficiency fluctuation reaches only 1%, resulting from the charge current deviation caused by the chemical reaction in the battery.

Figure 17:
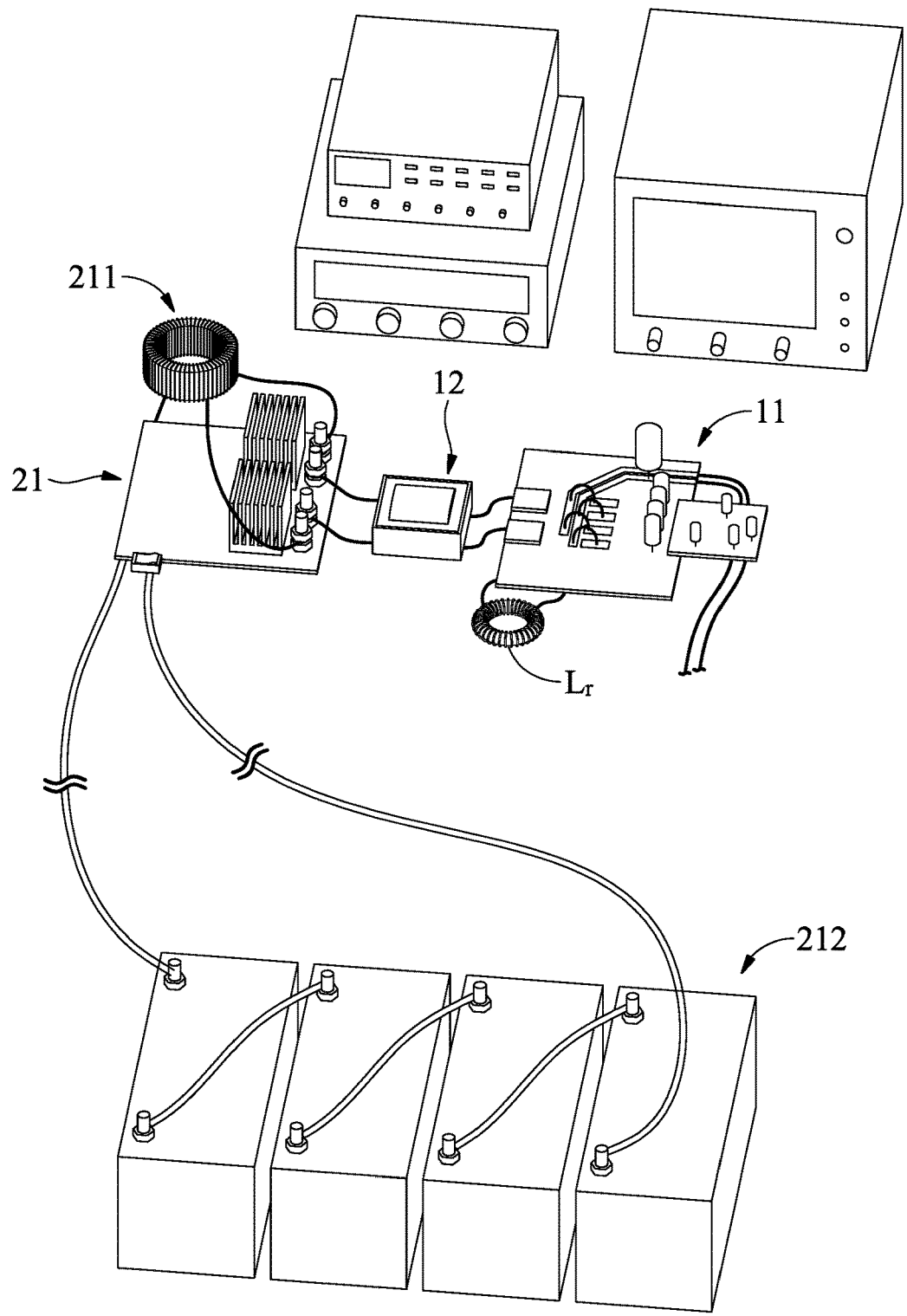
FIG. 17(a) is a schematic diagram of an Experimental setup of the PS-FB converter as shown in FIG. 2(a).
FIG. 17(b) is a schematic diagram of the PS-FB converter as shown in FIG. 2(a) including the output port/input port.
Figure 17:
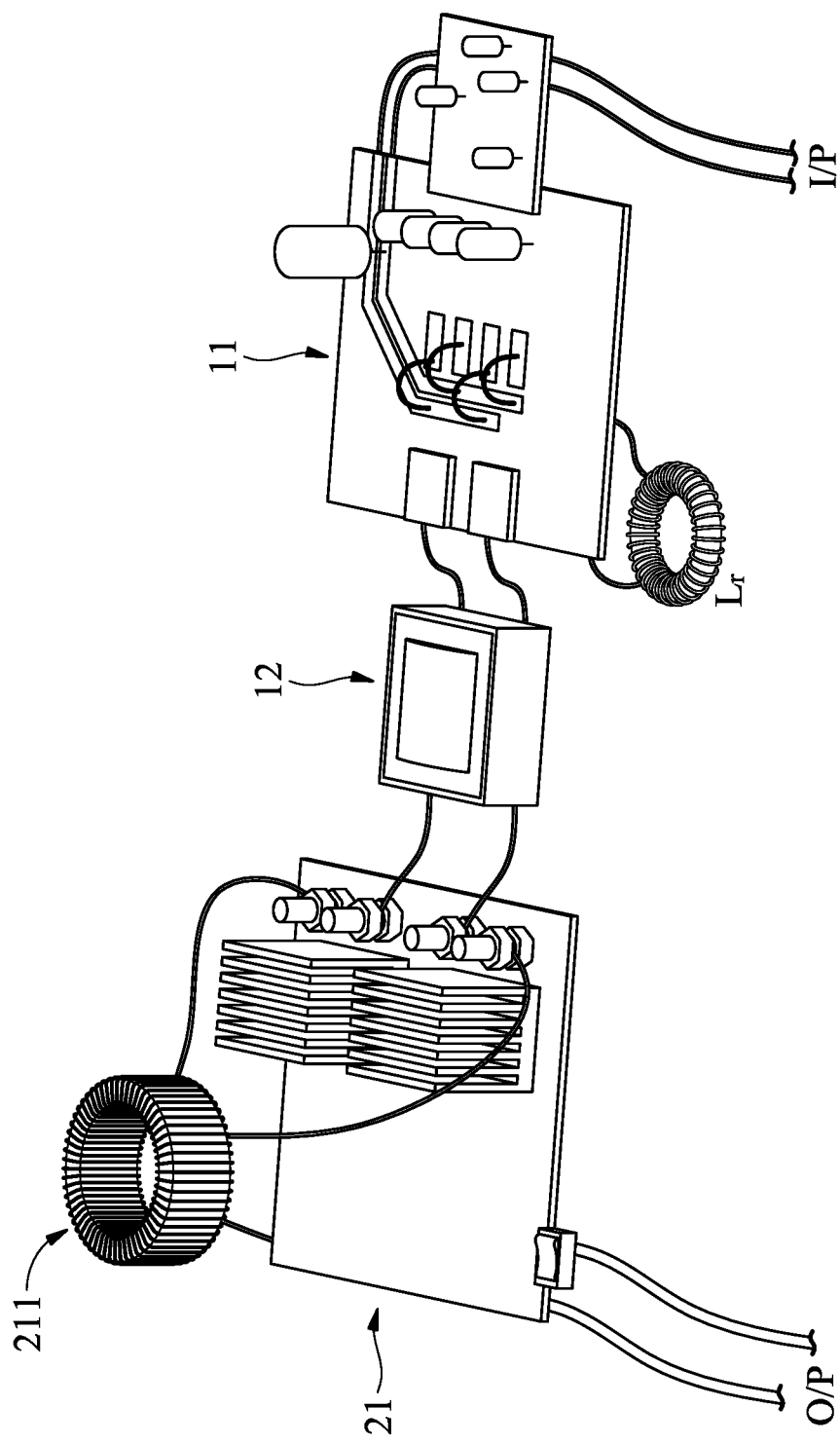

FIG. 17(a) shows a schematic diagram of an Experimental setup of the PS-FB converter as shown in FIG. 2(a). FIG. 17(b) shows a schematic diagram of the PS-FB converter as shown in FIG. 2(a) including the output port/input port. The experimental setup of the proposed PS-FB converter with HCMR is shown in FIG. 17(a)-17(b).

According to the above-mentioned descriptions, the present invention discloses a PS-FB converter with a half-current multiplier rectifier (HCMR) filter and a control method thereof, wherein the filter is based on a structure of an autotransformer and can increase an output current of the PS-FB converter to a 1.5 times of an output current of the filter, the converter can cause a primary side current of its main transformer to have a relatively lower transition level and a relatively shorter transition time, which demonstrates the non-obviousness and novelty.

While the invention has been described in terms of what is presently considered to be the most practical and preferred embodiments, it is to be understood that the invention need not be limited to the disclosed embodiments. Therefore, it is intended to cover various modifications and similar configuration included within the spirit and scope of the appended claims, which are to be accorded with the broadest interpretation so as to encompass all such modifications and similar structures.

What is claimed is:

1. A phase-shifted full-bridge converter, comprising:
a full-bridge switching circuit having a first and a second output terminals;
a main transformer having a primary winding and a secondary winding, each of which has a first and a second terminals, wherein the first terminal of the primary winding is coupled to the first output terminal, and the second terminal of the primary winding is coupled to the second output terminal; and
a half-current-multiplier rectifier (HCMR) filter including:
a first and a second diodes, each of which has an anode and a cathode, and
an autotransformer having a first winding, a second winding, a single-core and a center tap, wherein the phase-shifted full-bridge converter is sequentially operated in cycle of a Phase-I and a Phase-II, the first winding has a first inductance and a first number of turns, the second winding has a second inductance and a second number of turns, the first inductance equals the second inductance, and the first number of turns equals the second number of turns, the anode of the first diode is electrically connected to the anode of the second diode, one end of the first winding and one end of the second winding are both electrically connected to the center tap, the other end of the first winding is electrically connected to the cathode of the first diode and the first terminal of the secondary winding, the other end of the second winding is electrically connected to the cathode of the second diode and the second terminal of the secondary winding, and the center tap and the anode of the first diode have an output voltage therebetween.

2. The phase-shifted full-bridge converter according to claim 1, further comprising a load, wherein one end of the load is electrically connected to the center tap, and the other end of the load is electrically connected to the anode of the first diode.

3. The phase-shifted full-bridge converter according to claim 2, further comprising a resonant inductor and a coupling capacitor, wherein the coupling capacitor and the resonant inductor are electrically connected between the first output terminal and the first terminal of the primary winding in series.

4. The phase-shifted full-bridge converter according to claim 3, wherein the autotransformer further includes a primary winding and a secondary winding, when the phase-shifted full-bridge converter is operated under the Phase-I, a voltage difference between the first output terminal and the second output terminal is a positive value, and a first cross voltage of the secondary winding of the main transformer is larger than 0, and is three times of a second cross voltage of the load, the first winding is the secondary winding of the autotransformer, the second winding is the primary winding of the autotransformer, an induced common current flowing through the primary winding of the autotransformer is 0.5 times of a series current flowing through the secondary winding of the autotransformer, and an output current flowing into the load from the center tap is a sum of the series current and the induced common current, and is 1.5 times of the series current, the main transformer has a primary side current flowing through the primary winding of the main transformer, the induced common current is reflected to the primary winding of the main transformer to cause slopes of a valid duty cycle and a dead-zone period of the primary side current both to be increased such that the primary side current has a relatively lower transition level and a relatively shorter transition time.

5. The phase-shifted full-bridge converter according to claim 4, wherein when the phase-shifted full-bridge converter is operated under the Phase-II, a voltage difference between the first output terminal and the second output terminal is a negative value, and the first cross voltage of the secondary winding of the main transformer is less than 0, and an absolute value of the first cross voltage is three times of a second cross voltage of the load, the first winding is the primary winding of the autotransformer, the second winding is the secondary winding of the autotransformer, the induced common current is 0.5 times of the series current, and the output current is the sum of the series current and the induced common current, and is 1.5 times of the series current, the induced common current is reflected to the primary winding of the main transformer to cause the slopes of the valid duty cycle and the dead-zone period of the primary side current both to be increased such that the primary side current has the relatively lower transition level and the relatively shorter transition time.

6. A control method of a phase-shifted full-bridge converter, wherein the phase-shifted full-bridge converter includes a full-bridge switching circuit having a first and a second output terminals, a main transformer having a primary winding and a secondary winding, and coupled to the switching circuit, and an autotransformer having a primary winding, a secondary winding and a center tap, and coupled to the main transformer, the control method comprising:

when a voltage difference between the first output terminal and the second output terminal is a positive value, a first cross voltage of the secondary winding of the main transformer is larger than 0, and is three times of a second cross voltage of the load, causing an induced common current flowing through the primary winding of the autotransformer to be 0.5 times of a series current flowing through the secondary winding of the autotransformer, and causing an output current flowing into the load from the center tap to be 1.5 times of the series current; and when the voltage difference between the first output terminal and the second output terminal is a negative value, the first cross voltage of the secondary winding of the main transformer is less than 0, and an absolute value of the first cross voltage is three times of the second cross voltage of the load, causing the induced common current flowing through the primary winding of the autotransformer to be 0.5 times of the series current flowing through the secondary winding of the autotransformer, and causing the output current flowing into the load from the center tap to be 1.5 times of the series current.

7. The control method according to claim 6, further comprising providing a filter coupled to the secondary winding of the main transformer, wherein the filter includes a first and a second diodes, each of which has an anode and a cathode, and the autotransformer has a first winding and a second winding, the anode of the first diode is electrically connected to the anode of the second diode, one end of the first winding and one end of the second winding are both electrically connected to the center tap, the other end of the first winding is electrically connected to the cathode of the first diode and one end of the secondary winding of the main transformer, and the other end of the second winding is electrically connected to the cathode of the second diode and the other end of the secondary winding of the main transformer, when the voltage difference is a positive value, the first winding is the secondary winding of the autotransformer, and the second winding is the primary winding of the autotransformer, and when the voltage difference is a negative value, the first winding is the primary winding of the autotransformer, and the second winding is the secondary winding of the autotransformer.

8. A control method of a phase-shifted full-bridge converter, wherein the phase-shifted full-bridge converter includes a full-bridge switching circuit having a first and a second output terminals, a main transformer having a primary winding and coupled to the switching circuit, and an autotransformer having a primary winding and coupled to the main transformer, the control method comprising:

providing an induced common current flowing through the primary winding of the autotransformer; and causing the induced common current being reflected to the primary winding of the main transformer to cause a primary side current flowing through the primary winding of the main transformer to increase both slopes of a valid duty cycle and a dead-zone period such that the primary side current has a relatively lower transition level and a relatively shorter transition time.

9. The control method according to claim 8, further comprising providing a filter coupled to the main transformer, wherein the main transformer further includes a secondary winding having a first and a second terminals, the autotransformer further comprises a secondary winding and a center tap, the filter includes a first and a second diodes, each of which has an anode and a cathode, a load and the autotransformer having a first winding and a second winding, the anode of the first diode is electrically connected to the anode of the second diode, one end of the first winding and one end of the second winding are both electrically connected to the center tap, the other end of the first winding is electrically connected to the cathode of the first diode and the first terminal of the secondary winding of the main transformer, and the other end of the second winding is electrically connected to the cathode of the second diode and the second terminal of the secondary winding of the main transformer, when a voltage difference between the first output terminal and the second output terminal is a positive value, the first winding is the secondary winding of the autotransformer, and the second winding is the primary winding of the autotransformer, and when the voltage difference is a negative value, the first winding is the primary winding of the autotransformer, and the second winding is the secondary winding of the autotransformer.

10. The control method according to claim 9, wherein a time period of the voltage difference is a sum of a transition period and a work period, the sum of the transition period and the work period is a fixed value, when the transition period is increased, the work period is decreased, when a transition time is decreased to result in a decrease of the transition period, the work period is increased, the full bridge switching circuit further includes four power switches Q1-Q4, a leading bridge arm and a lagging bridge arm, the power switches Q1 and Q2 are configured on the leading bridge arm, and the power switches Q3 and Q4 are configured on the lagging bridge arm.

* * * * *